United States Patent
Brigandat et al.

(10) Patent No.: US 10,538,458 B2
(45) Date of Patent: Jan. 21, 2020

(54) COMPOSITION COMPRISING AN AMORPHOUS CALCIUM ALUMINATE AND ASSOCIATED PRODUCTION METHOD

(71) Applicant: KERNEOS, Puteaux (FR)

(72) Inventors: Pierre Brigandat, Ste Foy les Lyon (FR); Jamel Mahiaoui, Carcassonne (FR); Jacques Estival, Bourgoin Jallieu (FR)

(73) Assignee: KERNEOS, Puteaux (FR)

( * ) Notice: Subject to any disclaimer, the term of this patent is extended or adjusted under 35 U.S.C. 154(b) by 59 days.

(21) Appl. No.: 15/577,788

(22) PCT Filed: Jun. 3, 2016

(86) PCT No.: PCT/FR2016/051337
§ 371 (c)(1),
(2) Date: Nov. 29, 2017

(87) PCT Pub. No.: WO2016/193642
PCT Pub. Date: Dec. 8, 2016

(65) Prior Publication Data
US 2018/0127315 A1    May 10, 2018

(30) Foreign Application Priority Data
Jun. 3, 2015   (FR) .................................. 15 55036

(51) Int. Cl.
| | | |
|---|---|---|
| *C04B 28/06* | (2006.01) |
| *C04B 7/32* | (2006.01) |
| *C04B 7/02* | (2006.01) |
| *C04B 111/00* | (2006.01) |

(52) U.S. Cl.
CPC .............. *C04B 28/065* (2013.01); *C04B 7/02* (2013.01); *C04B 7/32* (2013.01); *C04B 2111/00215* (2013.01)

(58) Field of Classification Search
CPC ........... C04B 28/065; C04B 7/32; C04B 7/02; C04B 2111/00215
See application file for complete search history.

(56) References Cited

FOREIGN PATENT DOCUMENTS

| | | | | |
|---|---|---|---|---|
| DE | 36 10 586 A1 | 12/1987 | | |
| DE | 3610586 A1 | * 12/1987 | ............. | C04B 7/326 |
| JP | 2014 129204 A | 7/2014 | | |
| JP | 2014129203 A | 7/2014 | | |
| WO | WO-2015173526 A1 | * 11/2015 | ............. | C04B 28/06 |

OTHER PUBLICATIONS

K Nakagawa et al.: "A Study of Hydration of Amorphous Calcium Aluminate by Selective Dissolution Analysis", Cement and Concrete Research Copyright (C), Jan. 1, 1990 (Jan. 1, 1990), vol. 20 No. 4, pp. 655-661, XP055262904, Retrieved from the Internet.
International Search Report, dated Aug. 19, 2016, from corresponding PCT/FR2016/051337 application.

* cited by examiner

*Primary Examiner* — Anthony J Green
(74) *Attorney, Agent, or Firm* — Young & Thompson

(57) ABSTRACT

Disclosed is a composition including an amorphous calcium aluminate with a final lime:alumina molar ratio between lower and upper limits. The amorphous calcium aluminate is a combination including at least: a first amorphous calcium aluminate with a first lime to alumina molar ratio, strictly lower than the lower limit of the predetermined range; and a second amorphous calcium aluminate with a second lime to alumina molar ratio, strictly higher than the upper limit of the predetermined range. The combination includes a first amount of the first amorphous calcium aluminate and a second amount of the second amorphous calcium aluminate, the first and second amounts being determined in such a way that the final lime to alumina molar ratio of the amorphous calcium aluminate, corresponding to the average of the first and second lime to alumina molar ratios weighted by the first and second amounts, is within the predetermined range.

17 Claims, 3 Drawing Sheets

COMPOSITION COMPRISING AN AMORPHOUS CALCIUM ALUMINATE AND ASSOCIATED PRODUCTION METHOD

TECHNICAL FIELD OF THE INVENTION

The present invention relates to the field of amorphous calcium aluminate-based compositions.

It relates more specifically to a composition comprising an amorphous calcium aluminate with a final lime to alumina molar ratio, which may be selected within a predetermined range.

The present invention further relates to a method for making such a composition.

TECHNICAL BACKGROUND

Calcium aluminates are one of the major components of aluminous cements that are frequently used for making binders, concretes or mortars (construction chemistry mortars, refractory mortars, etc.).

There are two main aluminous cement classes to be particularly distinguished from each other: crystalline calcium aluminate cements characterized both by their chemical composition and their crystalline phases (mineral phases), and amorphous calcium aluminate cements characterized by their chemical composition.

In fact, calcium aluminates are in part amorphous or in part crystalline, and are classified among one class or the other, depending on the rates of amorphous phases and crystalline phases they include.

Calcium aluminates having mostly crystalline phases are subsequently referred to as "crystalline calcium aluminate", and calcium aluminates having mostly amorphous phases are subsequently referred to as "amorphous calcium aluminate".

Here, we will especially focus on compositions comprising amorphous calcium aluminates. These are for the most part composed of calcium oxide or lime CaO (also noted C in cement notation), alumina $Al_2O_3$ (noted A in cement notation), and optionally of silica $SiO_2$, iron oxide $Fe_2O_3$, or other impurities commonly included in the raw materials.

It is known that amorphous calcium aluminates may be characterized by their molar or their weight ratio of lime (C) to alumina (A), more frequently referred to as the C/A ratio (cement works abbreviation).

Indeed, the properties of the amorphous calcium aluminates, as well as the applications resulting therefrom highly depend on the C/A molar ratio.

For example, binders containing amorphous calcium aluminates which C/A molar ratio is higher than 1.8 have a very fast setting time, that is to say of about a few minutes at most. On the contrary, those which C/A molar ratio is lower than 1.8 have a slower setting time, which may extend to a couple of hours.

As an example, an amorphous calcium aluminate with a C/A molar ratio lower than 1.8 will be chosen when a binder is expected, with a relatively long implementation timeline and some workability over time (auto-leveling soil resurfacing or precast work); or an amorphous calcium aluminate with a C/A molar ratio ranging from 1.5 to 1 will be chosen when a binder is expected, for use in the production of a screed or a flooring adhesive (setting time between 2 and 4 hours).

On the contrary, when an ultra-fast setting binder is expected, for use in the production of mortar or concrete in a wet environment, amorphous calcium aluminate will be used with a C/A molar ratio ranging from 1.8 to 2 (setting time of from 10 to 20 minutes). Likewise, for making a shotcrete or an anchoring capsule for which a setting time of from about a few seconds to 10 minutes is needed, an amorphous calcium aluminate will be chosen with a C/A molar ratio ranging from 2 to 2.2.

Thus, for each intended application, it is required to accurately determine and to optimize the C/A molar ratio of the amorphous calcium aluminate used and conversely, precisely determining the C/A molar ratio of an amorphous calcium aluminate makes it possible to choose the applications suitable for it. The corollary to this is that, once the application is determined, the molar ratio value of the amorphous calcium aluminate used should remain as close as possible to the ideal ratio required by the application, typically in the range of ±0.1, ideally in the range of ±0.05, or ±0.02.

Today, the amorphous calcium aluminates are therefore produced so as to have a predetermined lime to alumina molar ratio depending on the intended application.

In practice, such amorphous calcium aluminates having a predetermined C/A molar ratio may be currently obtained through a so-called chemical process, for example, through a melting process followed by a fast cooling-down. Document DE3610586 gives an example of such an amorphous calcium aluminate.

Obtaining by a chemical reaction this amorphous calcium aluminate with the C/A molar ratio predetermined is achieved through given time and temperature conditions, together with reactants selected and combined in suitable proportions.

In particular, this amorphous calcium aluminate may be currently obtained by a melting process. This melting process consists in heating in a vertical melting furnace and at very elevated temperatures (1300° C.-2300° C.) a suitable amount of limestone blocks ($CaCO_3$) and a suitable amount of monohydrate bauxite (a mineral rock that is rich in alumina and that contains iron and silica in variable amounts) for a time period enabling the complete melting of these raw materials (from around 2 to 10 hours). After this step, a liquid mass is recovered through a tap hole located in the lower part of the furnace. The liquid mass, which has in particular a temperature ranging from 1300° C. to 1600° C. is then suddenly drastically cooled-down to a temperature below its crystallization temperature (typically at most 1200° C., more conventionally lower than 1000° C.). Once cooled down, the product called clinker, is thereafter ground to form an amorphous calcium aluminate in the form of a powder, also called amorphous calcium aluminate cement.

However, this process of production requires restrictive and expensive operating conditions, both regards the energetic and the time requirements. Indeed, the use of very elevated temperatures, ranging from 1300° C. to 1600° C., for a substantial time period are needed for making this chemically-induced amorphous calcium aluminate.

In addition, raw materials such as bauxite blocks comprise, to varying degrees, oxides (iron oxide, silica) which may be detrimental to the reproducibility of the thus formed amorphous calcium aluminate and also to the expected C/A molar ratio specific determination.

Furthermore, since the intended application of each amorphous calcium aluminate depends on its C/A molar ratio, it is appropriate to produce separately a large number of different amorphous calcium aluminates, each having a C/A molar ratio suitable for a particular application, which increases the industrial complexity.

In particular, for each targeted lime to alumina molar ratio (C/A), it is necessary to optimize the experimental conditions, especially, the choice of the raw materials and their respective proportions, the curing temperature (a high alumina rate requires a higher curing temperature), the curing time, and the final cooling down time.

Furthermore, the crystalline calcium aluminates are known for a long time and are produced by a melting process followed by a slow cooling down, or by sintering.

They are for example, described by Kopanda et al., in the publication «Production Processes, Properties and Applications for Calcium Aluminate Cements», Alumina Chemicals Science and Technology handbook, American Ceramic Society (1990), pp 171-181. Among the main crystalline phases reported by Kopanda et al., those who are most commonly upgraded in the industrial applications are monocalcium aluminate ($CaO$—$Al_2O_3$, or CA in cement notation), dodeca-calcium hepta-aluminate ($(CaO)_{12}$—$(Al_2O_3)_7$, or C12A7 in cement notation) or monocalcium di-aluminate ($(CaO)$—$(Al_2O_3)_2$, or CA2 in cement notation).

Different products that contain crystalline calcium aluminates are commercially available and it is known to classify these products by their alumina rate, i.e. by the alumina weight they contain, based on the total weight of the dry product: about 40% (in the Ciment Fondu® of Kerneos Company), 50% (in the Secar®51 of Kerneos Company), or 70% (in the Secar®71 of Kerneos Company).

It is also known that the dissolution rate of the crystalline calcium aluminates mixed with water is highly dependent on the nature and the amounts of each crystalline phase comprised in the crystalline calcium aluminate.

For example, the CA crystalline phase has a dissolution rate suitable for applications requiring a control of the open time, i.e. a control of the time during which it is possible to process the crystalline calcium aluminate once it has been mixed with water. Examples include Secar®71, Secar®51 cements and Ciment Fondu® cited above.

Conversely, crystalline calcium aluminates containing more lime, especially more crystalline phase C12A7, can be used for certain applications requiring hydration (or a water dissolution) as quickly as possible (e.g shot concrete). An example includes the product marketed in the past under the trademark Shotax® by Lafarge Fondu International Company.

Thus, it is known to combine various crystalline calcium aluminates to optimize the dissolution rate of a crystalline calcium aluminate.

However, it is found that mixing in water two crystalline calcium aluminates, each having a known overall chemical composition, i.e. a known C/A molar ratio, does not predict the final C/A molar ratio of the dissolved crystalline calcium aluminate resulting from this mixing.

Besides, mere knowledge of the chemical composition of a crystalline calcium aluminate does not predict its behavior, so that an increase of a few percentage points of C12A7 can result in a significant decrease in the open time of a mortar or lead to an immediate setting of this mortar.

For example, the man skilled in the art knows that the mixture of two crystalline calcium aluminates, ground to the same fineness (or Blaine's specific surface area), one containing mainly the crystalline phase C12A7 (such as Shotax®) with a C/A molar ratio that is equal to 1.7, and the other containing the crystalline phases CA and CA2 (such as Secar®71) with a C/A molar ratio that is equal to 0.64, the mixing being conducted in suitable proportions to provide a C/A molar ratio of 1 for the resulting crystalline calcium aluminate, results in a flash setting (i.e. of about one minute) when it is prepared in simple mortar (preparation and composition according to Standard EN 196-1, but with 500 g of cement, 1350 g of sand and 200 g of water). Yet, the behavior associated with this crystalline calcium aluminate mixture is very different from the behavior associated with a crystalline calcium aluminate of CA crystalline phase, with a C/A molar ratio close to 1, directly obtained by a melting or sintering process, which has in the same test conditions a setting time of about three hours.

Accordingly, there is no general method for designing a crystalline calcium aluminate mixture which reactivity would be controlled or could be predetermined.

Furthermore, it is also known to mix a crystalline calcium aluminate and an amorphous calcium aluminate in order to obtain a final calcium aluminate having the desired properties.

A calcium aluminate obtained by mixing powders of crystalline calcium aluminate and amorphous calcium aluminate in given proportions is known for example from JP2014129203.

However, the final calcium aluminate obtained via such a process comprises fewer amorphous phase than the calcium aluminates obtained chemically, and its properties are therefore different from those of the amorphous calcium aluminates chemically obtained described above.

In particular, the measurement of the C/A molar ratio of calcium aluminate powders obtained through this method does not correspond to the amount of lime and alumina which really goes into solution upon contacting these powders with water. As a consequence it is not possible to predict the C/A molar ratio of such compounds.

Thus, there is a real need for developing a new composition comprising an amorphous calcium aluminate with a C/A ratio comprised within a predetermined range, and having at least the same reactive properties as the amorphous calcium aluminates known to date. Further, there is still a need in the state of the art for providing at least one method for making a composition comprising amorphous calcium aluminate for which the desired C/A molar ratio could be chosen and which would be easy and fast to implement.

It is thus one of the objectives of the present invention to provide a new composition comprising amorphous calcium aluminate as well as a new method for making such composition, while avoiding, at least in part, the previously mentioned drawbacks.

AIM OF THE INVENTION

To that end, it is an object of the present invention to provide a composition comprising an amorphous calcium aluminate with a final lime to alumina molar ratio Rf comprised within a predetermined range, which extends between a lower limit Ri and an upper limit Rs, said lower limit Ri being different from the upper limit Rs, wherein said amorphous calcium aluminate is a combination composed of at least:

a first amorphous calcium aluminate with a first lime to alumina molar ratio R1, that is strictly lower than the lower limit Ri of said predetermined range, and a second amorphous calcium aluminate with a second lime to alumina molar ratio R2 strictly higher than the upper limit Rs of said predetermined range, and wherein said combination comprises a first amount of the first amorphous calcium aluminate and a second amount of the second amorphous calcium aluminate, said first and second amounts being determined so that the final lime to alumina molar ratio of the amorphous calcium aluminate, corresponding to the average of the first and second lime to alumina molar ratios weighted by said first and second amounts, is within said predetermined range.

In particular, said first and second amounts of said first and second amorphous calcium aluminates are determined so that the lime to alumina molar ratio of the mixture formed by these first and second amorphous calcium aluminates is equal to the desired final lime to alumina molar ratio $R_F$.

As used herein, a "combination" is intended to mean a mixture, wherein the starting components are intimately bound without reacting with each other to form an other compound, that is to say here, in the frame of the composition, both the first amorphous calcium aluminate and the second amorphous calcium aluminate are still present. In other words, the term "combination" is intended to mean an operation after which the starting components are in the form of a homogeneously mixed powder. This may be verified using an electronic scanning microscope in chemical analysis mode. Thus, each of the starting components of said combination can still be distinguished from each other microscopically.

As used herein, the "lime to alumina molar ratio" is intended to mean the ratio between the lime material amount and the alumina material amount expressed in moles, contained in an amorphous calcium aluminate. In the following description, said lime to alumina molar ratio will often be abbreviated C/A molar ratio, or just molar ratio.

As can be seen in the following description, the desired final lime to alumina molar ratio $R_F$ is selected depending on the application wherein the composition according to the invention is intended to be used.

Advantageously, according to the invention, the composition is adapted to form an amorphous calcium aluminate cement.

In the rest of the description, the "cement" is intended to mean a powder of amorphous calcium aluminate.

The cement may be used as a "binder", also called "hydraulic binder". As used herein, a "binder" is intended to mean a powder, or a combination of powders, adapted for being combined with water to form a material with a pasty texture which may cure (or harden) to gather aggregates with each other.

In other words, in the rest of the description, the word "binder" or "hydraulic binder" will be used for indicating materials, which, mixed with water, undergo a cold-curing (or hardening), without the addition of any other reactive body, in air or in water.

When said "hydraulic binder" is combined with water and cures (or hardens) when it comes into contact with the same, it is said to be setting.

In the frame of the invention, the setting time depends on the C/A molar ratio: the higher it is, the faster the setting or curing (hardening). The preparation method according to the invention thus enables to obtain compositions, wherein amorphous calcium aluminates have a precise C/A molar ratio depending on the expected applications for these compositions.

Moreover, other compounds may be added to the composition.

For example, binders such as Portland cements, calcium sulfates, or a combination thereof may be added to the composition.

Thus, according to the invention, the composition is advantageously adapted to form a hydraulic binder.

Some hydraulic binders may gather fine materials such as sands and/or aggregates to form mortars and/or concretes.

Thus, some aggregates may then also be added to the composition, which is then advantageously adapted to form a mortar or a concrete, as a function of the particle size of such aggregates.

As used herein, a "mortar" is classically intended to mean a material comprising a hydraulic binder, sand or other fine aggregates such as calcium carbonate, and optionally admixtures. It can be distinguished from concrete in that it does not comprise gravels. It is a mixture having a pasty texture and, which may be used to make stones or concrete blocks cohesive to each other. It may also act as an adhesive, and be used to fill spaces between building stones for example. Mortar may moreover be used as such, and agglomerates with itself.

As used herein, "concrete" is intended to mean a building material formed by mixing a hydraulic binder together with aggregates, and optionally completed with admixtures. Such mixture, used in the plastic state on the work site or in plants, may take various forms because it is moldable. It hardens little by little to finally form a monolith.

The present invention further relates to a method for making a composition comprising an amorphous calcium aluminate with a final lime to alumina molar ratio Rf selected within a predetermined range, which extends between a lower limit Ri and an upper limit Rs, said lower limit Ri being different from the upper limit Rs, wherein, a) a first amorphous calcium aluminate is chosen with a first lime to alumina molar ratio R1, that is strictly lower than the lower limit Ri of said predetermined range, and a second amorphous calcium aluminate is chosen with a second lime to alumina molar ratio R2, that is strictly higher than the upper limit Rs of said predetermined range, b) the respective amounts of said first and second amorphous calcium aluminates to be combined are determined so that the final lime to alumina molar ratio Rf of amorphous calcium aluminate, corresponding to the average of said first and second lime to alumina molar ratios R1, R2 weighted through said respective amounts, is within said predetermined range;

c) said first and second amorphous calcium aluminates are combined according to amounts determined in step b).

Other non-limitative and advantageous characteristics of the preparation method of the invention are as follows:

in step a), said first and second amorphous calcium aluminates are chosen in the form of powders, and, in step c), these powders are combined so as to obtain said amorphous calcium aluminate-containing composition;

in step a), the first and second amorphous calcium aluminates are chosen in the form of clinkers, and, in step c), these clinkers are combined through co-grinding so as to obtain said amorphous calcium aluminate-containing composition.

Optionally, grinding agents or other additives providing additional properties can also be combined either in step a) or step c).

In the following description and unless otherwise specified, values mentioned as ranging from "X to Y" or "comprised between X and Y" are intended to include values X and Y. On the contrary, values ranging "strictly from X to Y" or "strictly comprised between X and Y" are intended to exclude values X and Y.

According to the invention, all weight percentages, unless otherwise specified, are expressed as compared to the composition dry matter weights (binder, mortar or concrete).

BRIEF DESCRIPTION OF THE DRAWINGS

The description which follows by reference to the appended drawings, given as non-limiting examples, will better explain the content of the present invention and the way it may be implemented.

On the appended drawings.

DETAILED DESCRIPTION OF THE INVENTION

The applicant focused on developing a new composition comprising amorphous calcium aluminate which C/A molar ratio may be adapted depending on the targeted applications and especially on the desired hydraulic setting time for the work to be built, in mortar or concrete for instance.

Figure 1:
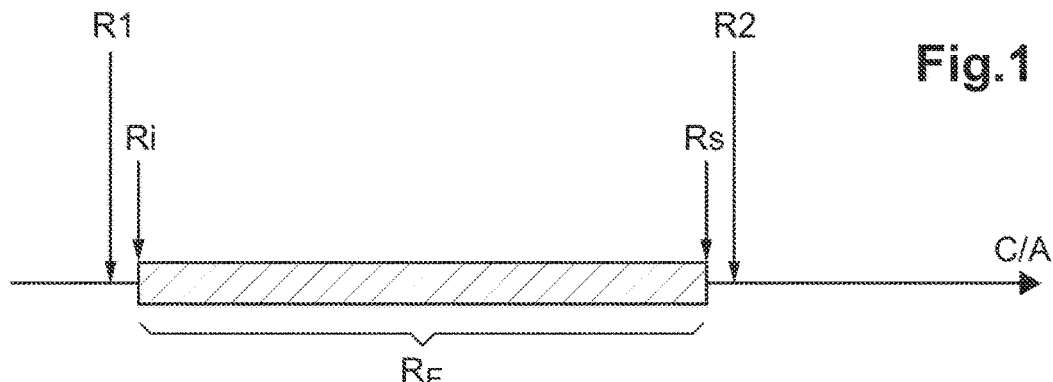
FIG. 1 is a diagram illustrating the first and second molar ratios R1, R2 of the first and second amorphous calcium aluminates, as compared to the final C/A molar ratio Rf of said amorphous calcium aluminate contained in the composition of the invention, said final molar ratio Rf being comprised between a lower limit Ri and an upper limit Rs.

To that end and referring to FIG. 1, the present invention relates to a composition comprising an amorphous calcium aluminate with a final lime to alumina molar ratio Rf comprised within a predetermined range, which extends between a lower limit Ri and an upper limit Rs, said lower limit Ri being different from the upper limit Rs, wherein said amorphous calcium aluminate is a combination composed of at least:

a first amorphous calcium aluminate with a first lime to alumina molar ratio R1, that is strictly lower than the lower limit Ri of said predetermined range, and a second amorphous calcium aluminate with a second lime to alumina molar ratio R2 strictly higher than the upper limit Rs of said predetermined range. The applicant surprisingly discovered that the combination of a first amorphous calcium aluminate with a—relatively low—first C/A molar ratio, noted R1, and a second amorphous calcium aluminate with a second—higher—C/A molar ratio, noted R2, forms a final amorphous calcium aluminate with a precise C/A molar ratio strictly ranging from R1 to R2, such final amorphous calcium aluminate behaving then similarly to an amorphous calcium aluminate with analogous C/A molar ratio that would be obtained chemically.

Thus, while the first and second amorphous calcium aluminates used for the combination are each not suitable for the intended application when they are considered apart, because their first and second respective molar ratios R1, R2 are too far from the appropriate molar ratio $R_F$ for said application, it is possible to produce easily an amorphous calcium aluminate which final molar ratio $R_F$ is suitable for the intended application.

The molar ratio suitable for the intended application must be comprised between said first and second molar ratios R1, R2. In other words, one of said first and second molar ratios is strictly higher than the desired final molar ratio $R_F$ and the other is strictly lower than this final molar ratio $R_F$.

As will be detailed in the following description, the composition of the invention may be used to form, among others, a cement, an ettringite binder or a mortar. Unexpectedly, the applicant discovered that the reactive or the mechanical properties of these cements, ettringite binders or mortars are similar to those of cements, ettringite binders or mortars formed from the already known amorphous calcium aluminates, with a similar C/A molar ratio.

As used herein, a "final amorphous calcium aluminate" is intended to mean the combination of the first and second amorphous calcium aluminates.

"The first and second calcium aluminates" refer to two combinations comprising:

mostly, a calcium aluminate such as described below, and optionally, minimally, other compounds such as impurities and/or processing agents, for example, anti-ageing processing agents and/or grinding agents.

As a rule, a calcium aluminate—whatever the first amorphous calcium aluminate, the second amorphous calcium aluminate or the final amorphous calcium aluminate, is said to be amorphous when it comprises, by weight, as compared to the total weight of said amorphous calcium aluminate, at least 60% of amorphous phases, in particular at least 70% and typically 80%, or even 90% of amorphous phases, that is to say its crystalline phase rate is respectively lower than or equal to 40%, 30%, 20% or even 10%.

As used herein, "at least 60% of amorphous phases" is intended to include at least 60%, 65%, 70%, 75%, 80%, 82%, 84%, 85%, 86%, 87%, 88%, 89%, 90%, 91%, 92%, 93%, 94%, 95%, 96%, 97%, 98%, 99%, or even 100% of amorphous phases.

If present, the crystalline phases may be $CaO.Al_2O_3$ (noted in the following CA), $CaO.2Al_2O_3$ (noted in the following CA2), $3CaO.Al_2O_3$ (noted in the following C3A), $3CaO.3Al_2O_3+CaF_2$, $11CaO.7Al_2O_3.CaF_2$, $12CaO.7Al_2O_3$ (noted in the following C12A7), $4CaO.Al_2O_3.Fe_2O_3$ (noted in the following C4AF), or $3CaO.3Al_2O_3+CaSO_4$ (noted in the following C4A3$) or a combination thereof. In general, the crystalline phases may be $CaO.Al_2O_3$, or $12CaO.7Al_2O_3$ or a combination thereof. Crystallin phases such as 2CaO.Al$_2$O$_3$.SiO$_2$ (noted in the following C2AS) can also be found.

In particular, said combination forming the final amorphous calcium aluminate comprises a first amount of the first amorphous calcium aluminate and a second amount of the second amorphous calcium aluminate, said first and second amounts being determined such that the final lime to alumina molar ratio R$_F$ of said final amorphous calcium aluminate, corresponding to the average of the first and second lime to alumina molar ratios R1, R2 weighted by said first and second amounts, is within said predetermined range.

For example, this predetermined range corresponds to a range surrounding the R$_F$ value, bringing together the values of the molar ratio for which the same application may be implemented.

In other words, the final lime to alumina molar ratio Rf of said final amorphous calcium aluminate has the following mathematics formula:

$$Rf = M1/(M1+M2) \times R1 + M2/(M1+M2) \times R2,$$

wherein M1 and M2 are the respective weights of the first and second amorphous calcium aluminates in the combination.

More specifically, in practice, the weight of the first and second amorphous calcium aluminates M1, M2 and the weight of the final amorphous calcium aluminate are approximated to the weight of the chemical compounds of calcium aluminates they comprise, any impurities and/or any processing agents being a minority.

Particularly advantageously, the C/A molar ratio of the final amorphous calcium aluminate can thus be regulated depending on the respective proportions of the first to the second amorphous calcium aluminates within the combination and this, without requiring the use of a chemical process.

Thus, it is not required anymore to use the chemical process for making each amorphous calcium aluminate adapted to a particular application, i.e. which C/A molar ratio would be appropriate for this particular application.

This behavior is all the more surprising as it is not the case for the crystalline calcium aluminates: combining two crystalline calcium aluminates does not generally provide a final crystalline calcium aluminate having a predictable reactivity as a function of reactivity of the two crystalline calcium aluminates combined.

Indeed, herein, depending on the known exact values of the first and second molar ratios R1, R2, it is possible to determine the respective weight M1, M2 of said first and second amorphous calcium aluminates that the combination forming the final amorphous calcium aluminate must comprise so that the final molar ratio R$_F$ of this amorphous calcium aluminate is comprised in the predetermined range defined by the lower and upper limits Ri, Rs.

In particular, by knowing the first and second molar ratios R1, R2 of said first and second amorphous calcium aluminates, it is possible to determine the respective weight M1, M2 of said first and second amorphous calcium aluminates to be combined in such a way that the final molar ratio R$_F$ of amorphous calcium aluminate is equal to a predetermined value selected in said predetermined range.

Preferably, said combination comprises, by weight as compared to the total weight of said combination, from 99.9% to 0.01%, preferably from 5% to 95% and typically from 10% to 90% of first amorphous calcium aluminate and from 0.01% to 99.9%, preferably from 5% to 95% and typically from 10% to 90% of second amorphous calcium aluminate.

In practice, the final molar ratio R$_F$ is selected in accordance with the application for which the composition comprising the final amorphous calcium aluminate of the invention is intended.

Thus, the predetermined range (Ri, Rs) is a range of possible values for the final molar ratio R$_F$ so that the targeted application is feasible whatever the molar ratio R$_F$ value selected within this predetermined range.

The predetermined range also takes account, on one hand, of the possible uncertainty that the ideal (or appropriate) final molar ratio R$_F$ associated with a particular application is known and, on the other hand, of the precision with which one is able to achieve this ideal final molar ratio R$_F$. Especially, the determination inaccuracies of the first and second molar ratios R1, R2, associated with the first and second amorphous calcium aluminates, and the respective weighing inaccuracies of said first and second amorphous calcium aluminates weights M1, M2, can generate inaccuracies in the achievement of the final molar ratio R$_F$ of the amorphous calcium aluminate combination.

In practice, the difference between the upper limit Rs and the lower limit Ri of said predetermined range is higher than or equal to 0.02, preferably higher than or equal to 0.05, and lower than or equal to 0.2, preferably lower than or equal to 0.1.

In general, said "difference" is intended to mean the difference in absolute terms. As used herein, the difference between the lower and the upper limits Ri, Rs is thus equal to |Rs−Ri|.

In particular, the difference between the upper limit Rs and the lower limit Ri of said predetermined range may be equal to 0.02; 0.03; 0.04; 0.05; 0.06; 0.07; 0.08; 0.09; 0.1; 0.11; 0.12; 0.13; 0.14; 0.15; 0.16; 0.17; 0.18; 0.19; or 0.2.

Alternatively, it is also possible to consider that the predetermined range is greater so as to include a large number of different values of final molar ratio R$_F$ suitable for various particular applications. Thus, from a given couple of two first and second amorphous calcium aluminates, it is possible to obtain several final amorphous calcium aluminates suitable for different applications, the final molar ratio R$_F$ of each final amorphous calcium aluminate which may be obtained being within the predetermined range. Conveniently, it is thus possible to obtain final amorphous calcium aluminates suitable for various particular applications, even though neither the first amorphous calcium aluminate nor the second amorphous calcium aluminate, taken either alone, are suitable for these applications.

According to this embodiment, the difference between the upper limit Rs and the lower limit Ri of said predetermined range is higher than or equal to 0.05, in particular, higher than or equal to 0.2 and typically higher than or equal to 0.5.

According yet to this embodiment, the difference between said upper limit Rs and said lower limit Ri of said predetermined range is strictly lower than 20, in particular lower than 10 and typically lower than 5.

In particular, according to this embodiment, the final molar ratio R$_F$ has a value strictly higher than 0.01 and strictly lower than 20, preferably ranging from 0.5 to 9, especially from 1 to 3 and typically from 1.38 to 2.15.

As used herein, a range higher than 0.05 and following values includes 0.1; 0.15; 0.2; 0.25; 0.3; 0.35; 0.4; 0.45; 0.5; 0.55; 0.6; 0.7; 0.8; 0.9; 1; 1.1; 1.2; 1.3; 1.4; 1.5; 1.6; 1.7; 1.8; 1.9; 2; 2.1; 2.2; 2.3; 2.4; 2.5; 2.6; 2.7; 2.8; 3; 3.5; 4; 4.5; 5; 5.5; 6; 6.5; 7; 7.5; 8; 8.5; 9; 9.5, or even 10 or more.

Furthermore, as used herein, a range strictly lower than 20 and following values includes 19; 18; 17; 16; 15; 14; 13; 12; 11; 10; 9; 8; 7; 6; 5; 4.5; 4; 3.9; 3.8; 3.7; 3.6; 3.5; 3.4; 3.3; 3.2; 3.1; 3; 2.9; 2.8; 2.7; 2.6; 2.5; 2.4; 2.3; 2.1; 2; 1.9; 1.8; 1.7; 1.6; 1.5; 1.4; 1.3; 1.2; 1.1; 1; 0.9; 0.8; 0.7 or less.

Thus, according to this embodiment, the difference between said upper and lower limits Rs, Ri is at least 0.05, on the understanding that it still remains strictly lower than the difference between said first and second molar ratios R1, R2.

Furthermore, in general, whatever the contemplated embodiment, it is preferred that the difference between the lower limit Ri of the predetermined range and the first molar ratio R1 of the first amorphous calcium aluminate Ri–R1 is at least 0.05, preferably at least 0.1 and typically from 0.15 to 0.3.

Likewise, it is preferred that the difference between the upper limit Rs of the predetermined range and the second molar ratio R2 of the second amorphous calcium aluminate R2–Rs is at least 0.05, preferably at least 0.1 and typically from 0.15 to 0.3.

Thus, the first and second amorphous calcium aluminates which are not suitable, when taken separately, for the targeted particular application, are however adapted to form the final amorphous calcium aluminate suitable for this particular application. Advantageously, this characteristic is verified both when the predetermined range is such that it is possible to achieve final molar ratios $R_F$ that are suitable only for one application, or when the predetermined range is such that it is possible to achieve final molar ratios $R_F$ which are sufficiently distant from each other to be suitable for different applications.

All the amorphous calcium aluminates known to date may be suitably used as the first and/or second amorphous calcium aluminate.

As a rule, the first and second amorphous calcium aluminates can be chemically obtained such as described hereabove in the description of the prior art, which represents the most traditional way to obtain amorphous calcium aluminates. This method is known to the man skilled in the art. It will not therefore be further detailed herein.

In particular, such first and second amorphous calcium aluminates that are relatively easy to obtain through this chemical process will be preferably used as initial components.

As an alternative, the final amorphous calcium aluminates formed by the combination of said first and second amorphous calcium aluminates may also be suitable as first and/or second amorphous calcium aluminate(s) for making other compositions according to the invention.

According to a first embodiment, the first and second amorphous calcium aluminates used are in the form of powders. These powders have for example a median diameter d50, which is lower than or equal to 100 micrometers (μm). In particular, the median diameter d50 of the powders, as determined by laser granulometry according to Standard ISO 13320, may vary typically between 5 μm and 30 μm. The median diameter d50 corresponds to the diameter, below which 50 percent by weight of the studied population is present (here, the powder particles).

In particular, said powders have a specific surface area (Blaine value), as measured according to Standard NF EN196-6, ranging from 2500 cm$^2$/g to 9000 cm$^2$/g.

According to another embodiment, the first and second amorphous calcium aluminates used may be in the form of a clinker.

As used herein, an "amorphous calcium aluminate clinker" is intended to mean an amorphous calcium aluminate coming in the form of hard particles, with generally a characteristic dimension of about a few millimeters. These hard particles result from the cooking at elevated temperatures (typically at around 1300° C.-1600° C.), typically in a melting furnace or in an electric furnace, of a first alumina source material (like bauxite blocks or alumina) and of a second calcium oxide source material (like limestone or lime), then from the sudden cooling-down of these melted materials. An amorphous calcium aluminate clinker is thus the product treated by the melting furnace and which has undergone a quenching (cooling at a temperature gradient higher than 15° C. per second). Such clinker may thereafter be ground to form a powder.

As a rule, the first and second amorphous calcium aluminates have respectively a first and a second precise lime to alumina molar ratios R1, R2, which are distant from each other. Indeed, particularly advantageously, final amorphous calcium aluminates with different molar ratios located anywhere within the predetermined range will be all the more obtained, as said first and second molar ratios R1, R2 are distant from each other.

Thus, the first amorphous calcium aluminate is preferably chosen for its low first lime to alumina molar ratio R1, whereas the second amorphous calcium aluminate is in particular chosen for its high second lime to alumina molar ratio R2.

Advantageously, the difference between said first and second molar ratios R1, R2 is higher than or equal to 0.1, in particular higher than or equal to 0.5, preferably higher than or equal to 0.8.

As used herein, a "difference higher than or equal to 0.1 and following values" is intended to mean a difference of 0.1; 0.2; 0.3; 0.4; 0.5; 0.6; 0.7; 0.8; 0.9; 1; 1.1; 1.2; 1.3; 1.4; 1.5; 1.6; 1.7; 1.8; 1.9; 2; 2.1; 2.2; 2.3; 2.4; 2.5; 2.6; 2.7; 2.8; 3; 3.5; 4; 4.5; 5; 5.5; 6; 6.5; 7; 7.5; 8; 8.5; 9; 9.5, or even 10 or more.

In particular, the difference between said first and second molar ratios R1 and R2 is lower than or equal to 20, in particular lower than or equal to 5.

As used herein, a "difference lower than or equal to 20 and following values" is intended to mean a difference of 20; 19; 18; 17; 16; 15; 14; 13; 12; 11; 10; 9; 8; 7; 6; 5; 4.5; 4; 3.9; 3.8; 3.7; 3.6; 3.5; 3.4; 3.3; 3.2; 3.1; 3; 2.9; 2.8; 2.7; 2.6; 2.5; 2.4; 2.3; 2.1; 2; 1.9; 1.8; 1.7; 1.6; 1.5; 1.4; 1.3; 1.2; 1.1; 1; 0.9; 0.8; 0.7 or less.

Typically, the difference between said first and second molar ratios R1 and R2 is higher than or equal to 0.1, preferably higher than or equal to 0.5 and typically higher than or equal to 0.8 and lower than or equal to 20, preferably lower than or equal to 9 and typically lower than or equal to 5.

The first molar ratio R1 of said first amorphous calcium aluminate is for example ranging from 0.01 to 3, in particular from 1 to 2.

As used herein, a "molar ratio ranging from 0.01 to 3" is intended to include for example: 0.01; 0.02; 0.03; 0.04; 0.05; 0.06; 0.07; 0.08; 0.09; 0.10; 0.11; 0.12; 0.13; 0.14; 0.15; 0.16; 0.17; 0.18; 0.19; 0.20; 0.21; 0.22; 0.23; 0.24; 0.25; 0.26; 0.27; 0.28; 0.29; 0.30; 0.31; 0.32; 0.33; 0.34; 0.35; 0.36; 0.37; 0.38; 0.39; 0.40; 0.41; 0.42; 0.43; 0.44; 0.45; 0.5; 0.6; 0.7; 0.8; 0.9; 1.0; 1.1; 1.2; 1.3; 1.4; 1.5; 1.6; 1.7; 1.8; 1.9; 2.0; 2.1; 2.2; 2.3; 2.4; 2.5; 2.6; 2.7; 2.8; 2.9; 3.0.

The second molar ratio R2 of second amorphous calcium aluminate is for example ranging from 1.5 to 15, preferably from 1.5 to 10, in particular ranging from 1.8 to 8, typically from 2 to 3.

As used herein, a molar ratio ranging from 1.5 to 20 comprises for example: 1.5; 1.6; 1.7; 1.8; 1.9; 2.0; 2.1; 2.2; 2.3; 2.4; 2.5; 2.6; 2.7; 2.8; 2.9; 3.0; 4.0; 4.5; 5.0; 5.5; 6.0; 6.5; 7.0; 7.5; 8.0; 8.5; 9.0; 9.5; 10.0; 10.5; 11.0; 11.5; 12; 13; 14; 15; 16; 17; 18; 19; 20.

As cited above, the first and second amorphous calcium aluminates may comprise small amounts of impurities, such as silica, iron oxide, optionally borate and phosphate, or any other impurities from the raw materials used in the preparation of these first and second amorphous calcium aluminates. These impurities can then be also detected in the final amorphous calcium aluminate.

Preferably, silica, iron oxide, borate and phosphate, when present in the first and second amorphous calcium aluminates, represent less than 10% by weight as compared to the total weight of said final amorphous calcium aluminate.

Moreover, at least one of the first and second amorphous calcium aluminates comprised within said combination forming the final amorphous calcium aluminate may comprise an organic compound with at least two hydrophilic functions and one hydrophobic chain.

Such an organic compound acts as an anti-ageing agent of said first and second amorphous calcium aluminates.

The organic compound represents from 0.025% to 5%, preferably from 0.05% to 2.5%, advantageously from 0.1% to 1% by weight as compared to the total weight of first or second amorphous calcium aluminate into which it is incorporated.

Preferably, the first and second amorphous calcium aluminates both comprise such an organic compound as an anti-ageing agent.

As a consequence, due to the combination of said first and second amorphous calcium aluminates to form the final amorphous calcium aluminate, said final amorphous calcium aluminate itself comprises such an organic compound.

Thus, the composition according to the invention comprises itself such an organic compound forming anti-ageing agent.

As used herein, "functions with a hydrophilic character" is intended to mean functions which enable to ensure the compatibility with a water-containing medium. These hydrophilic functions are furthermore capable of reacting with cations or metallic elements.

The hydrophilic functions, which may be suitably used in the present invention are especially carboxylic acid, acid anhydride, acid halide and primary amine functions.

The preferred hydrophilic functions of the invention are acid functions and acid anhydride functions.

The hydrophobic character of the organic compound is provided by an aliphatic, aromatic, alkylaromatic or arylaliphatic hydrocarbon chain. In particular, linear or cyclic, branched or substituted aliphatic, arylaliphatic, chains are preferred. They advantageously comprise from 2 to 13 carbon atoms.

For example, the following organic compounds may be suitably used as an anti-ageing agent: polycarboxylic acids such as dicarboxylic acids such as glutaric acid, succinic acid, adipic acid, octanedioic acid, decanedioic acid, dodecanedioic acid, brassylic acid and their anhydrides and acid halides, phthalic acids like orthophthalic acid, terephthalic acid, isophthalic acid or a combination thereof. Adipic acid may be very especially suitably used as an anti-ageing agent.

Combined acids may also be used and more particularly a combination of adipic acid, succinic acid and glutaric acid.

Advantageously, the first and second calcium aluminates comprising such an organic compound are less sensitive to moisture. As a consequence, the final amorphous calcium aluminate is also less sensitive to moisture.

Furthermore, the composition of the invention may advantageously form an amorphous calcium aluminate cement.

Thus, the composition of the invention may comprise, by weight, as compared to the total weight thereof, at least 20% of said final amorphous calcium aluminate, preferably at least 40%, typically at least 60% of said final amorphous calcium aluminate, or even up to 100% of said final amorphous calcium aluminate.

As used herein, "at least 20%" is intended to include 20%, 30%, 40%, 50%, 60%, 70%, 80%, 90%, 95%, 100%.

The composition of the invention, forming the amorphous calcium aluminate cement, may be classically mixed with water. For example, water may represent 35% by weight as compared to the cement dry total weight.

The composition of the invention may moreover comprise one or more other compounds selected from: calcium sulfate, Portland cement, or a combination thereof, and optionally one or more additives.

Advantageously, the composition of the invention is then adapted to form a hydraulic binder.

In particular, the composition of the invention may comprise, by weight as compared to the dry total weight thereof:

from 35% to 75%, preferably from 35% to 50%, of said final amorphous calcium aluminate such as previously defined;

from 25% to 65%, preferably from 50% to 65%, of calcium sulfate, and from 0% to 5% of one or more additives.

Calcium sulfate forms thus with the final amorphous calcium aluminate a particularly advantageous binder, that is called ettringite binder.

As used herein, an "ettringite binder" is intended to mean a hydraulic binder able to form ettringite, that is to say a mineral species composed of calcium sulfate and aluminum hydrate.

In particular, calcium sulfate is in the form of anhydrite, gypsum or hemi-hydrate, of natural or synthetic origin.

Preferably, calcium sulfate is in the form of anhydrite.

For example, it may be a synthetic anhydrite such as the one marketed by the Francis Flower company.

Here, calcium sulfate is in the form of powder of anhydrite with a median diameter d50 varying from 5 micrometers to 50 micrometers, preferably from 20 micrometers to 30 micrometers.

As an alternative, the composition of the invention may comprise, by weight as compared to the dry total weight thereof:

from 2% to 30%, preferably from 4% to 20%, of said final amorphous calcium aluminate such as previously defined, from 4% to 40%, preferably from 10% to 28%, of calcium sulfate, from 30% to 94%, preferably from 52% to 86%, of Portland cement, and from 0% to 5%, preferably from 0.1% to 3% of an additive.

As a further alternative, the composition of the invention, may comprise by weight as compared to the dry total weight thereof:

from 10% to 35%, preferably from 20% to 30%, of said amorphous calcium aluminate such as previously defined, from 15% to 56%, preferably from 30% to 55%, of calcium sulfate, from 2% to 30%, preferably from 4% to 20%, of Portland cement, and from 0% to 5% of an additive.

Portland cement is known from the person skilled in the art and will not be further detailed in the present invention. Any Portland cement can be suitably used, such as normal Portland cement, fast-setting Portland cement, ultra-fast setting Portland cement, white Portland cement, etc. A cement CEM I may be especially used.

The additives optionally added to the compositions of the invention forming hydraulic binders, may be different in natures. These are additives, that are classically used for hydraulic binders.

As a rule, they are added to the composition in small proportions and provide the latter with interesting properties.

The additives may for example correspond to set accelerators and/or set retarders known to the person skilled in the art.

Set accelerators, which may be suitably used in the present invention, may be of any type known. Their use enables to adjust the workability of the material obtained. To be mentioned as suitable examples are sodium aluminate, sodium silicate, potassium aluminate, aluminum sulfate, potassium carbonate, sodium carbonate, lithium salts such as lithium hydroxide, lithium sulfate and lithium carbonate, to be used either alone or in combinations.

In a particularly advantageous manner, sodium carbonate, associated with Portland cement and an ettringite binder according to the invention accelerate the setting of the composition mixed with water. This enables to improve the early-age mechanical strength of the material, that is to say the mechanical strength of the material within 24 hours after the mixing with water.

Suitable set retarders for use in the present invention may be of any type known. To be especially mentioned are, for example, citric acid, tartaric acid, gluconate, boric acid and their salts, that may be used either alone or in combination.

In particular, set-controlling agents selected from set accelerators and set retarders may represent from 0.01% to 5% by weight, preferably from 0.1% to 3% by weight as compared to the composition total weight of the invention.

The additive may also be a water-retentive agent and a rheology modifier, chosen for example from the family of cellulose ethers, guar ethers, starch ethers, associative polymers, polymers obtained through biofermentation such as xanthan gums, wellane gums, etc.

The additive may also be an anti-ageing agent, for example in the form of a powder.

The composition of the invention may further comprise aggregates.

In particular, the composition of the invention may further comprise, by weight as compared to the composition total weight from 50% to 95%, preferably from 60% to 90%, of aggregates.

Advantageously, the composition of the invention is then adapted to form a mortar or a concrete depending on the aggregate sizes.

Classically, in mortars, aggregates have a relatively small mean diameter, for example lower than the one of gravels. Aggregates that are used herein correspond to sand.

On the contrary, in concretes, aggregates have a higher mean diameter; these may be gravels or small gravels.

It should be noted herein, that the "composition total weight" is intended to refer to the weight of the composition comprising said aggregates.

Thus, a mortar according to the invention may comprise, by weight as compared to the dry mortar total weight, from 10% to 50%, preferably from 20% to 40%, of any one of the previously described compositions according to the invention (cement or hydraulic binder), from 50% to 90%, preferably from 60% to 80%, of aggregates.

In particular, the water mixing ratio for such a mortar varies from 10% to 50%, preferably from 20% to 30%.

Likewise, a concrete according to the invention may comprise, by weight as compared to the dry concrete total weight, from 5% to 40%, preferably from 10% to 30%, of any one of the previously described compositions according to the invention, from 60% to 95%, preferably from 70% to 90%, of aggregates.

In particular, the water mixing ratio for such a concrete varies from 5% to 30%, preferably from 5% to 15%.

The mortars and concretes of the invention are produced according to a traditional method known from the person skilled in the art, wherein all the components and aggregates used in the composition are weighed separately, then combined with water.

This method being known to the person skilled in the art, it will not be further detailed hereafter.

The applicant advantageously demonstrated, as regards their properties, that mortars formulated from the previously described final amorphous calcium aluminates, with given lime to alumina molar ratios, have mechanical properties and reactivities similar to those of mortars formulated with chemically obtained amorphous calcium aluminates, having the same lime to alumina molar ratios.

In accordance with what precedes, it becomes evident that the composition of the invention may be used to form an amorphous calcium aluminate cement when it primarily comprises the powdered final amorphous calcium aluminate.

It may also be used to form a hydraulic binder, when it comprises said powder of final amorphous calcium aluminate and other hydraulic binders.

Lastly it may be used to form a mortar or a concrete when it comprises said powder of final amorphous calcium aluminate and/or other hydraulic binders and aggregates.

A suitable method for making the composition of the invention will now be described.

In particular, a method will be described, which can be suitably used for making the final amorphous calcium aluminate in the form of powder, in other words the amorphous calcium aluminate cement.

As a rule, the final amorphous calcium aluminate can be obtained by simply mixing the powder of said first and second amorphous calcium aluminates, or by co-grinding the clinkers of said first and second amorphous calcium aluminates in order to obtain a powder.

Thus, the present invention provides a method for making a composition comprising an amorphous calcium aluminate with a final lime to alumina molar ratio Rf selected within a predetermined range, which extends between a lower limit Ri and an upper limit Rs, said lower limit Ri being different from the upper limit Rs, wherein, a) a first amorphous calcium aluminate is chosen, with a first lime to alumina molar ratio R1, that is strictly lower than the lower limit Ri of said predetermined range, and a second amorphous calcium aluminate is chosen, with a second lime to alumina molar ratio R2, that is strictly higher than the upper limit Rs of said predetermined range, b) the respective amounts of said first and second amorphous calcium aluminates to be combined are determined so that the final lime to alumina molar ratio Rf of amorphous calcium aluminate, corresponding to the average of said first and second lime to alumina second ratios R1, R2 weighted by said respective amounts, is within said predetermined range;

c) said first and second amorphous calcium aluminates are combined according to the amounts determined in step b).

Advantageously, the method according to the invention has few steps and is easy to carry out. Thus, the composition of the invention is easy to prepare.

Thanks to the method of the invention, it is possible to determine the respective amounts of first and second amorphous calcium aluminates to be combined so that the final molar ratio $R_F$ of the amorphous calcium aluminate is equal to a predetermined value selected in said predetermined range.

The method of the invention implements several steps, which may be effected by an operator.

Prior to implementing the method, the operator determines the final molar ratio Rf of the amorphous calcium aluminate contained in the composition depending on the targeted application of said composition.

In other words, the operator determines the final molar ratio value $R_F$ he wants to reach in said predetermined range.

Said final molar ratio $R_F$ is thus within the predetermined range as defined by the lower and upper limits Ri, Rs.

As previously explained, said final molar ratio $R_F$ associated with a particular application can be reached taking into account uncertainties. For example, such uncertainty accounts for 5%, or 10%, of the final molar ratio $R_F$ sought to be achieved.

Thus, the lower limit Ri of the predetermined range is lower than or equal to the final molar ratio Rf minus said uncertainty. In the same manner the upper limit Rs of the predetermined range is higher than or equal to the final molar ratio Rf plus said uncertainty.

To return to the case where the uncertainty accounts for 5% of the final molar ratio Rf, the lower limit Ri of the predetermined range is lower than or equal to 95% of the final molar ratio Rf, and the upper limit Rs of the predetermined range is higher than or equal to 105% of the final molar ratio Rf.

In step a), the operator selects the first and second amorphous calcium aluminates to be combined.

To that end, the operator selects the first amorphous calcium aluminate so that its molar ratio, called first molar ratio R1, be strictly lower than the lower limit Ri of the predetermined range.

Likewise, the operator selects the second amorphous calcium aluminate so that its molar ratio, called second molar ratio R2, be strictly higher than the upper limit Rs of the predetermined range.

These first and second amorphous calcium aluminates may be found on the market or be prepared by the operator, for example by means of a chemical process.

For example, the described hereabove first and second amorphous calcium aluminates are perfectly suitable.

According to the embodiment previously described, to obtain a final amorphous calcium aluminate, which final molar ratio $R_F$ strictly belongs to a relatively large open predetermined range, for example to the predetermined range]1.34; 2.2[, the first and second amorphous calcium aluminates having respectively a first molar ratio R1 of 1.34 and a second molar ratio R2 of 2.2 can be selected, each being obtained according to a chemically reproducible method adjusted with the relevant parameters.

According to a first embodiment of the production method, in step a), the first and second amorphous calcium aluminates are chosen in the form of powders.

In particular, the operator can acquire the first and second amorphous calcium aluminates on the market in the form of powders.

As an alternative, the operator may chemically prepare the first and second amorphous calcium aluminates in the form of powders.

As a further alternative, the operator may purchase the first and second amorphous calcium aluminates in the form of clinkers, or prepare the first and second amorphous calcium aluminates in the form of clinkers. The operator then carries out a sub-step of step a), wherein the clinkers have to be separately ground so as to obtain a powder of each of said first and second amorphous calcium aluminates. The grinding of each of said clinkers may be effected in a traditional ball mill under conditions that are known to the person skilled in the art.

According to a second embodiment of the production method, in step a), the first and second amorphous calcium aluminates are chosen in the form of clinkers.

These clinkers are typically obtained chemically. They may also be commercially acquired.

Whatever the selected embodiment, in step b), the operator calculates, according to a classical barycenter calculation, said respective amounts for the first and second amorphous calcium aluminates to be combined, so as to obtain the expected amount of final amorphous calcium aluminate.

In general, said amounts of the first amorphous calcium aluminate, of the second amorphous calcium aluminate, and of the final amorphous calcium aluminate, are calculated as masses, in grams.

The weights of said first and second amorphous calcium aluminates and final amorphous calcium aluminate are approximated herein to the weights of the sole amorphous calcium aluminate chemical compounds they comprise, any impurities and/or any processing agents included in said first and second amorphous calcium aluminates and in the final amorphous calcium aluminate being a minority.

Thus, the following calculation method may be used to calculate the first and second masses M1, M2 of the first and second amorphous calcium aluminates to be combined:

$$(M1+M2) \times R_F = M1 \times R1 + M2 \times R2.$$

For example, the applicant showed that by combining 40%, by weight, of an amorphous calcium aluminate of first molar ratio R1 equal to 1.34 and 60%, by weight, of an amorphous calcium aluminate of second molar ratio R2 equal to 2.2, the final amorphous calcium aluminate has a final molar ratio $R_F$ of 1.81; whereas by combining the same first and second amorphous calcium aluminates in proportions 35%/65% or 45%/55%, a final molar ratio $R_F$ of 1.85 or 1.77 is respectively obtained.

In step c), the operator mixes the first and second amorphous calcium aluminates together.

According to the first embodiment of the method, in step c), the amorphous calcium aluminate powders are mixed directly to form the final amorphous calcium aluminate in the form of powder.

In other words, in step c), said powders are mixed so as to obtain said composition comprising the amorphous calcium aluminate.

These powders are mixed in a suitable mixing device. Any type of mixer adapted to powders may be suitable, for example a Lödige® mixer.

Generally, the mixing step duration ranges from 30 seconds to 30 minutes, preferably from 1 minute to 10 minutes.

This mixing step most of the time is executed at room temperature, that is to say at a temperature lower than 50° C., in general at a temperature ranging from 15° C. to 25° C.

As an alternative, the combination of said powders may be effected at a specific mixing temperature for the execution of special treatments on amorphous calcium aluminates resulting from organic additives. In this case, the specific mixing temperature corresponds to the melting temperature of the organic additive used.

According to the second embodiment of the method, in step c), clinkers of the first and second amorphous calcium aluminates are co-ground, that is to say they are ground and mixed simultaneously, so as to form the final amorphous calcium aluminate in the form of powder.

In other words, in step c), said clinkers are combined by co-grinding so as to obtain said composition comprising the amorphous calcium aluminate.

When the first and second amorphous calcium aluminates are chosen in the form of clinkers, this second method embodiment enables to save time since it makes it possible to execute two steps (grinding and combination) in a single one (co-grinding).

In particular, according to this second embodiment of the method, in step c), the first and second clinkers of amorphous calcium aluminates are co-ground for a time period ranging from 2 seconds to 30 minutes, in particular from 1 minute to 10 minutes.

Of course, any type of mixer adapted to clinkers may be suitably used for carrying out the method of the invention, for example ball mills.

Co-grinding is generally conducted without any specific temperature control, that is to say at a temperature typically ranging from room temperature and the temperature naturally reached by the grinding operation, which can reach 80° C., or even 100° C. or 160° C.

As an alternative, co-grinding of said clinkers may be conducted at a controlled mixing temperature for the execution of special treatments on amorphous calcium aluminates resulting from organic additives. In this case, the specific mixing temperature corresponds to the melting temperature of the organic additive used.

Of course, the composition prepared according to this method has the same characteristics as those of the composition of the invention. Since these have already been described, they will not be further detailed hereafter.

It will be just specified that the final amorphous calcium aluminate cement (or powder) obtained in step c) with this method generally has a median diameter d50 lower than or equal to 100 μm, preferably lower than or equal to 75 μm, typically lower than or equal to 50 μm. Typically, the median diameter d50 of said amorphous calcium aluminate cement, as determined by laser granulometry, varies from 5 μm to 30 μm.

In particular, the amorphous calcium aluminate cement has a specific surface area (Blaine value), measured according to Standard NF EN196-6, ranging from 2500 cm$^2$/g to 9000 cm$^2$/g.

Optionally, in step c), the operator may decide to add one or more compounds selected from calcium sulfate, Portland cement, or a combination thereof, and optionally one or more additives, which are typically also found in the form of powder.

The thus obtained composition then forms a binder according to the invention, and may be mixed together with water.

It should be noted that a simplified method, based on the hereabove described method of the invention, may be carried out to prepare an amorphous calcium aluminate cement which final molar ratio $R_F$ is not precisely chosen but simply comprised in a given range.

According to this simplified method, the operator only conducts steps a) and c).

According to this simplified method, by combining two amorphous calcium aluminates with distinct molar ratios, a composition is obtained, comprising an amorphous calcium aluminate which molar ratio is necessarily strictly included within a range delimited by the first and second molar ratios R1, R2 of the starting first and second amorphous calcium aluminates.

Generally speaking, the described present invention has many advantages.

It especially provides a great flexibility for preparing compositions comprising a final amorphous calcium aluminate since a plurality of final amorphous calcium aluminates can be obtained from only two initial amorphous calcium aluminates, and this, only by varying the proportion of each component within the combination. In other words, by varying the amount of each of the first and second amorphous calcium aluminates within the combination, a great number of various final molar ratios $R_F$ may be obtained, all within the predetermined range.

Therefore, it is not required anymore to use a chemical process to obtain an amorphous calcium aluminate with a particular lime to alumina molar ratio to match an intended application, from the moment this particular molar ratio is comprised between the first and the second molar ratios R1, R2 of known amorphous calcium aluminates.

In addition, the method according to the invention simplifies the preparation of compositions comprising an amorphous calcium aluminate, since it only has a few steps and all these steps are easy to carry out.

In addition, the production method of the invention is reproducible.

Moreover, the production method of the invention is all the more simplified for preparing compositions comprising a final amorphous calcium aluminate, as said starting first and second amorphous calcium aluminates are easily obtained through a chemical process or any other equivalent method.

In other respects, thanks to the present invention, the number of amorphous calcium aluminates to produce through a chemical process is reduced, which advantageously facilitates the inventory management, limits the loss of production due to the transitions during preparation or grinding, etc.

Moreover, the time needed to obtain compositions comprising a final amorphous calcium aluminate is substantially shortened as compared to the time needed to chemically produce amorphous calcium aluminates.

In addition and as will be shown in the experiment part, the amorphous calcium aluminate cements of the invention have surprisingly reactive properties, which are similar to those of chemically produced amorphous calcium aluminate cements, at an equivalent C/A molar ratio.

Indeed, as regards their properties, the hydraulic binders formulated from the amorphous calcium aluminate cements according to the invention, with given lime to alumina molar ratios, have reactivities similar to those hydraulic binders formulated from amorphous calcium aluminates obtained chemically, with close lime to alumina molar ratios. This is not the case for hydraulic binders formulated from the calcium aluminates obtained by mixing a crystalline calcium aluminate and an amorphous calcium aluminate (see description of the prior art), which have reactive properties that are different from those of hydraulic binders formulated from chemically obtained amorphous calcium aluminates.

Advantageously, the amorphous calcium aluminate cements according to the invention are indeed all the more reactive as their final lime to alumina molar ratio $R_F$ is high.

This is particularly advantageous considering that depending on said final lime to alumina molar ratio $R_F$, the amorphous calcium aluminate cements may be used for various applications.

Advantageously, thanks to the present invention, the final lime to alumina molar ratio $R_F$ of the final amorphous calcium aluminates can be regulated, which enables to control the reactivity of the materials (binders, mortars, concretes) incorporating them.

As mentioned in the description of the prior art, compositions comprising an amorphous calcium aluminate with a final molar ratio $R_F$ higher than 1.8 are said to be ultra-reactive insofar as they react in an exothermic manner within around ten seconds to around ten minutes after they have been put into contact with water.

Thus, compositions comprising an amorphous calcium aluminate with a final molar ratio $R_F$ ranging from 1.8 to 2.0 have generally a setting time which varies from 10 to 20 minutes and may be used for preparing fast setting mortars.

Compositions comprising an amorphous calcium aluminate with a final molar ratio $R_F$ ranging from 2.0 to 2.2 have a setting time which varies from about a few seconds to 10 minutes approximately and may be used pour preparing shotcretes or anchoring capsules.

On the contrary, the compositions comprising an amorphous calcium aluminate with a final molar ratio $R_F$ lower than 1.8 are less reactive insofar as they react in an exothermic manner, sometimes a couple of hours after they have been put into contact with water.

Thus, for example, compositions comprising an amorphous calcium aluminate with a lime to alumina molar ratio $R_F$ lower than 1.5 have a setting time which varies from 2 h to 4 h and may be used for preparing flooring adhesives or screeds.

Compositions comprising an amorphous calcium aluminate with a final molar ratio $R_F$ ranging from 1.5 to 1.8 have a setting time which varies from 20 minutes to 2 hours and may be used for auto-leveling soil resurfacing or precast works with particular materials.

The following examples illustrate the present invention, without limiting the same.

EXAMPLES

In a first part, preliminary tests are shown to demonstrate that crystalline and amorphous calcium aluminates have, surprisingly, different behaviors when they are combined with water.

In a second part, examples of amorphous calcium aluminates according to the invention have been prepared as well as amorphous calcium aluminates chemically obtained. They have been incorporated in compositions to respectively form cements, ettringite binders or even mortars. The reactivity and mechanical strength of these compositions have been measured and compared.

First Part—Preliminary Tests
Experimental Protocol:

Various calcium aluminates, amorphous or crystalline, are chemically obtained. For this purpose, conventionally, calcium oxide source (for example limestone) and alumina source (for example bauxite blocks) are introduced in a melting furnace. These raw materials are cooked in the melting furnace at a minimum temperature allowing the melting thereof and for a period of time allowing the complete melting thereof.

The melted product is then cooled down very slowly to form a crystalline calcium aluminate clinker. On the contrary, the melted product is cooled down quickly (in a few seconds) under its crystallization temperature to form an amorphous calcium aluminate clinker.

Each resulting clinker is then grinded to a specific surface area (Blaine value) of about 4000 $cm^2/g$.

The thus obtained powder is suspended in water at a concentration of 100 g/L (grams per liter), with stirring.

After stirring for 5 minutes, a solution sample is taken and filtered.

An inductively coupled plasma mass spectrometry (ICP-MS) method is then carried out for measuring the calcium ion and aluminum ion concentrations in the filtered solution.

The ratio of these concentrations is converted to C/A molar ratio.

The Preliminary Table below shows the C/A molar ratios of the amorphous or crystalline calcium aluminate clinkers chemically obtained, and the C/A molar ratios of the solutions with which they have been in contact.

The "Delta" column shows the difference between the C/A molar ratios of the same calcium aluminate taken in the form of clinker or taken in solution, based on the C/A molar ratio of this calcium aluminate in the form of clinker

| Preliminary Table | | | | | |
|---|---|---|---|---|---|
| Amorphous calcium aluminates | | | Crystalline calcium aluminates | | |
| Clinker C/A | Solution C/A | Delta (%) | Clinker C/A | Solution C/A | Delta (%) |
| 0.85 | 0.91 | 7 | 0.80 | 0.46 | −43 |
| 1.20 | 1.24 | 3 | 1.00 | 0.52 | −48 |
| 1.71 | 1.81 | 6 | 1.71 | 1.40 | −18 |
| 2.09 | 2.05 | −2 | | | |

Results:

This preliminary experiment demonstrates that the C/A molar ratios of the crystalline calcium aluminates in solution are very different from the C/A molar ratios of the crystalline calcium aluminate clinkers.

Moreover, the difference between the C/A molar ratio of the calcium aluminate in solution and the C/A molar ratio of the clinker is not constant from one crystalline calcium aluminate to another.

While the Applicant tried to explain the difference of C/A molar ratio upon the preparation of the solution of the crystalline calcium aluminates, he discovered surprisingly that this difference is very small for the amorphous calcium aluminates, which have a dissolution called congruent, that is to say, the C/A molar ratio of the species going into solution is substantially the same as the C/A molar ratio of the clinker, making thus possible the invention.

Indeed, very surprisingly, the C/A molar ratios of the amorphous calcium aluminates taken in the form of clinker or taken in solution are very similar, and this, whatever the amorphous calcium aluminate studied.

In the case of the crystalline calcium aluminates, it seems that a part of the lime and of the alumina contributing to the C/A molar ratio of the initial powder mixture is entrapped in crystalline phases having a very low or even no runoff degree, which can explain the differences between the molar ratios determined in the clinkers and those determined in solution.

Second Part

In Tables 1, 2 and 3 illustrating the examples, ACA stands for amorphous calcium aluminate.

A/Preparation of the Studied Products

A1—Preparation of the First and Second Amorphous Calcium Aluminates

First amorphous calcium aluminate, called hereafter, ACA1, is obtained according to a known method for making calcium aluminate Secar® 51 marketed by Kerneos company, except that the final step consists in a specific cooling-down.

In particular, ACA1 has been obtained according to the method comprising the following steps:
- introducing into a melting furnace limestone as a source of calcium oxide (40% by weight) and bauxite blocks as a source of alumina (60% by weight);
- cooking in the melting furnace at a minimum temperature enabling the melting of the composition, that is to say at 1550° C., for a time enabling to achieve the complete melting of the raw materials, that is to say for 10 hours;
- recovering said liquid calcium aluminate right at the furnace outlet;
- cooling down after cooking said liquid calcium aluminate, so as to suddenly lower its temperature to a temperature below its crystallization temperature, so as to obtain an amorphous calcium aluminate clinker, that is to say cooling with a gradient of 15° C. per second;
- grinding the amorphous calcium aluminate clinker so as to obtain a powder of first amorphous calcium aluminate ACA1, called cement of first amorphous calcium aluminate ACA1.

First amorphous calcium aluminate ACA1 has a rate of amorphous phases higher than or equal to 80%, and its lime to alumina molar ratio R1 is 1.34.

Moreover it has a median diameter d50 of 10 μm.

The second calcium aluminate, called hereafter ACA2, is obtained according to a known method for making calcium aluminate LDSF® RG marketed by Kerneos company, except that the final step consists in a specific cooling-down.

In particular, ACA2 has been obtained according to the method comprising following steps:
- introducing into a melting furnace limestone as a source of calcium oxide (60% by weight) and bauxite blocks as a source of alumina (40% by weight);
- cooking in the melting furnace at a minimum temperature enabling the melting of the composition, that is to say at 1450° C., for a time enabling to achieve the complete melting of the raw materials, that is to say for 10 hours;
- recovering said liquid calcium aluminate right at the furnace outlet;
- cooling down after cooking said liquid calcium aluminate, so as to suddenly lower its temperature to a temperature below its crystallization temperature so as to obtain an amorphous calcium aluminate clinker, that is to say cooling with a gradient of 15° C. per second;
- grinding the amorphous calcium aluminate clinker so as to obtain a cement of second amorphous calcium aluminate ACA2.

Amorphous calcium aluminate ACA2 has a rate of amorphous phases higher than or equal to 90%, and its lime to alumina molar ratio R2 is around 2.20.

Moreover it has a median diameter d50 of 10 μm.

A2—Preparation of the Calcium Aluminate Cements According to the Invention and of Comparative Cements To prepare compositions of the invention forming cements, ACA1 and ACA2 have been combined in a Lödige® mixer for a time period of 5 minutes in various amounts summarized in following Table 1.

Moreover, amorphous calcium aluminate cement ACA-Transition acts as a comparative example.

This amorphous calcium aluminate cement ACA-Transition is obtained according to a method that is similar to that for ACA1 and ACA2. This method comprises the following steps consisting in:
- introducing into a melting furnace limestone as a source of calcium oxide (52% by weight) and bauxite blocks as a source of alumina (48% by weight);
- cooking these materials in the melting furnace at 1500° C., for 10 hours;
- recovering said liquid calcium aluminate right at the furnace outlet;
- cooling down after cooking said liquid calcium aluminate so as to obtain an amorphous calcium aluminate clinker, that is to say cooling with a gradient of 15° C. per second;
- grinding the amorphous calcium aluminate clinker so as to obtain the amorphous calcium aluminate cement ACA-Transition.

The lime to alumina molar ratio for the various cements has been evaluated through a classical crystallographic analysis, called X-ray fluorescence, on amorphous calcium aluminate powders. As a reminder, these molar ratios are referred to as R1 for ACA1, R2 for ACA2 and Rf for the cements according to the invention. RT is the molar ratio corresponding to the comparative amorphous calcium aluminate cement ACA-Transition.

Table 1 hereunder represents the various amorphous calcium aluminates studied. Percentages (%) express the weight of the given compound as compared to the amorphous calcium aluminate total weight.

TABLE 1

| Name | ACA1 (%) | ACA2 (%) | Internal composition | | |
|---|---|---|---|---|---|
| | | | lime (%) | alumina (%) | Rf |
| ACA1 | 100 | 0 | 38.0 | 51.8 | R1 = 1.34 |
| 1 | 90 | 10 | 39.2 | 50.8 | 1.41 |
| 2 | 80 | 20 | 40.4 | 49.7 | 1.48 |
| 3 | 70 | 30 | 41.6 | 48.7 | 1.56 |
| 4 | 60 | 40 | 42.8 | 47.6 | 1.64 |
| 5 | 50 | 50 | 44.1 | 46.6 | 1.72 |
| ACA-Transition | 0 | 0 | 47.7 | 49.5 | RT = 1.76 |
| 6 | 45 | 55 | 44.7 | 46.1 | 1.77 |
| 7 | 40 | 60 | 45.3 | 45.6 | 1.81 |
| 8 | 35 | 65 | 45.9 | 45.0 | 1.85 |
| 9 | 30 | 70 | 46.5 | 44.5 | 1.90 |
| 10 | 20 | 80 | 47.7 | 43.5 | 2.00 |
| 11 | 10 | 90 | 48.9 | 42.4 | 2.10 |
| ACA2 | 0 | 100 | 50.1 | 41.4 | R2 = 2.20 |

A3—Preparation of Ettringite Binders: Amorphous Calcium Aluminate Cement+Calcium Sulfate Various compositions according to the invention forming ettringite binders have been prepared.

They each comprise an amorphous calcium aluminate cement and calcium sulfate.

In particular, these ettringite binders according to the invention (LE2, LE4, LE7, LE9 in Table 2 hereunder) have been prepared from some of amorphous calcium aluminate cements of Table 1.

Two other comparative ettringite binders (LE-ACA1 and LE-ACA2) have also been prepared from the two initial amorphous calcium aluminates ACA1 and ACA2 (obtained through the chemical process).

Calcium sulfate that is used here is a synthetic anhydrite, which can be purchased from Francis Flower company.

Table 2 hereunder gives the composition of these various ettringite binder powders.

TABLE 2

| | | | Amounts (g) | | |
|---|---|---|---|---|---|
| Name | ACA used | Rf | ACA | Calcium sulfate | Citric acid |
| LE-ACA1 | ACA1 | R1 = 1.34 | 80 | 120 | 0.2 |
| LE2 | 2 | 1.48 | | | |
| LE4 | 4 | 1.64 | | | |
| LE7 | 7 | 1.81 | | | |
| LE9 | 9 | 1.90 | | | |
| LE-ACA2 | ACA2 | R2 = 2.20 | | | |

A4—Preparation of Mortars

Various compositions according to the invention forming mortars have been prepared (M3, M4, M5, M6, M7, M8 and M9 in Table 3 hereunder).

They each comprise an amorphous calcium aluminate cement of Table 1, Portland cement, calcium sulfate, sand, and additives. These compositions were mixed together with water in the amounts given in Table 3.

Comparative mortars have been prepared from the initial amorphous calcium aluminates (M-ACA1, M-ACA2) and the comparative amorphous calcium aluminate (M-Transition) obtained chemically.

Portland cement used is CEM I which may be purchased from Lafarge company. Sand may be purchased from Normensand company. The present sand sizes 0/2 mm.

The calcium sulfate used is synthetic anhydrite, which may be purchased from Francis Flower company.

Table 3 hereunder gives the composition of the various mortars studied.

In this Table 3, percentages (%) are expressed as compared to the dry mortar total weight (that is to say with no water).

B/Characterization Tests

B1—Exothermic Profiles

The reactivity of amorphous calcium aluminate cements of Table 1, ettringite binders of Table 2 and mortars of Table 3 was analyzed by studying exothermic profiles.

To that end, amorphous calcium aluminate cements and ettringite binders were mixed with water according to the following procedure.

50 grams of amorphous calcium aluminate cements were weighed, respectively of ettringite binder. The amorphous calcium aluminate cement, respectively the ettringite binder, was introduced into a plastic beaker and mixed by means of a wood tongue depressor.

In another plastic beaker, the suitable water amount was weighed so that water represents 35% by weight as compared to the powder total weight, that is to say 17.5 grams water were weighed here.

To the powder was added the thus weighed water and mixing was executed by means of a wood tongue depressor, for 30 seconds.

The mortars are made in the proportions of powders, water and additives shown in Table 3.

The reactivity of the amorphous calcium aluminate cements, ettringite binders and mortars thus formed is immediately followed after the 30 second-mixing with water.

To make exothermic profiles, the plastic beaker containing the mixture (cement together mixed with water, ettringite binder together mixed with water, or mortar) was placed in an isothermal polystyrene box, with a hole at the cover level. A temperature probe, called thermocouple, was then inserted into the isothermal box. This thermocouple was not put in contact with the material, it just enabled to measure the temperature within the isothermal box. The temperature in Celsius degrees (° C.) was thus followed, as a function of time in minutes (min).

For all the test duration, the external temperature was of about 23° C. and the relative moisture content was 50%.

B2—Compression Tests

Measurements of the mechanical resistance during compression have been conducted during drying on the ettringite binders, as well as on the mortars.

To that end, the ettringite binders with the composition indicated in Table 2 were used, except that they comprised 0.3% of citric acid, by weight as compared to the dry ettringite binder total weight.

TABLE 3

| | | Amounts (g) | | | | | Amounts (%) | | |
|---|---|---|---|---|---|---|---|---|---|
| Name | ACA used | Portland Cement | ACA | Calcium Sulfate | Sand | Water | Sodium Carbonate | Citric Acid | Tartaric Acid |
| M-ACA1 | ACA1 | 405 | 79.8 | 93.7 | 1350 | 270 | 0.273 | 0.03 | 0 |
| M3 | 3 | | | | | | | 0.02 | |
| M4 | 4 | | | | | | | 0.025 | |
| M5 | 5 | | | | | | | 0.03 | |
| M-Transition | ACA-Transition | | | | | | | 0.03 | |
| M6 | 6 | | | | | | | 0.03 | |
| M7 | 7 | | | | | | | 0.035 | |
| M8 | 8 | | | | | | | 0.035 | |
| M9 | 9 | | | | | | | 0.04 | |
| M-ACA2 | ACA2 | | | | | | | 0.04 | |

These ettringite binders were mixed with water according to the protocol described in the B1—exothermic profiles section. The ettringite binders were thereafter cast so as to form cylindrical prisms with 25 millimeter (mm) height and 25 mm diameter.

The mechanical compressive strength of these prisms was evaluated after 7 days drying at 23° C., under a relative moisture content of 50%.

In the same manner, the mortars with the composition indicated in Table 3 were cast so as to form prisms with a size of 4 centimeters (cm)×4 cm×16 cm.

The mechanical compressive strength of these prisms was evaluated after 4 hours drying, then after 24 hours drying.

The mechanical compressive strength for these various materials was evaluated according to Standard EN 196-1 modified as follows: the external temperature was 23° C. during the tests, the relative moisture content was 50%, and prisms did not undergo any moisture cure prior to compression tests.

C/Results

C1—Reactivity

Figure 2:
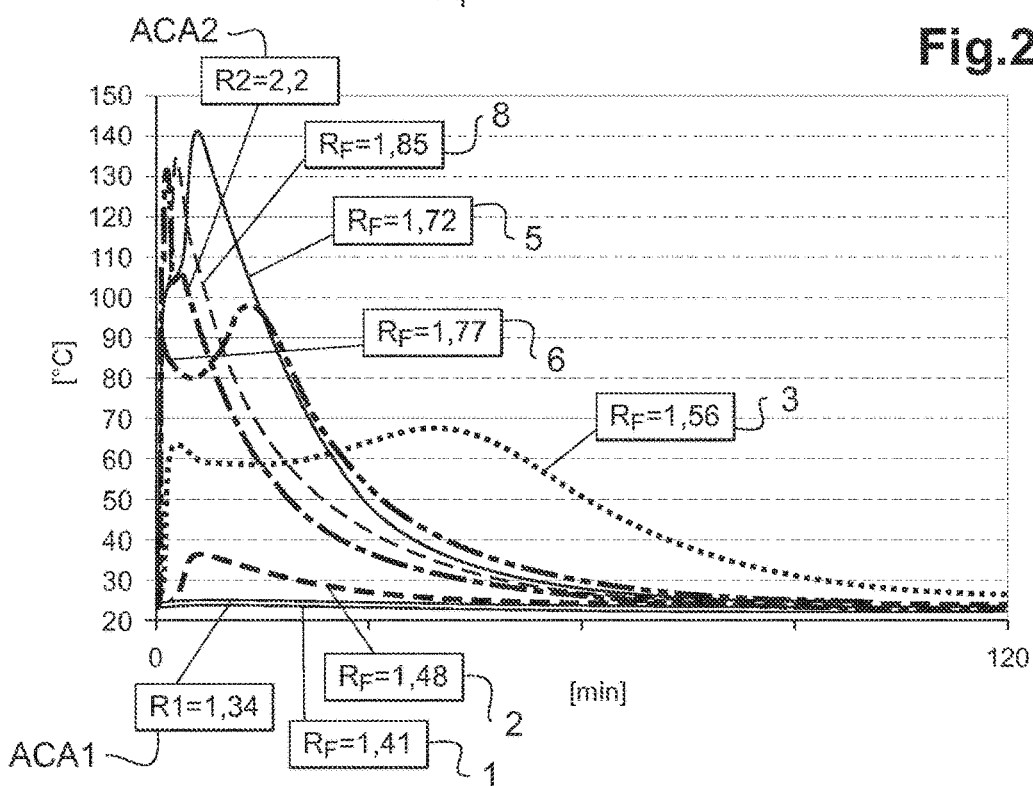
FIG. 2 is a diagram showing the exothermic profile of six compositions according to the invention forming amorphous calcium aluminate cements (Examples 1, 2, 3, 5, 6 and 8), and of the first and second amorphous calcium aluminates obtained chemically (ACA1, ACA2), said exothermic profile being an indication of the temperature evolution in Celsius degrees (° C.) as a function of time in minutes (min) after mixing with water.

On FIG. 2, exothermic profiles with short times, that is to say ranging from 0 minute to 2 hours, of the amorphous calcium aluminate cements mixed with water, according to the invention (Examples 1, 2, 3, 5 and 8) or obtained chemically (ACA1 and ACA2), showed that the reactivity of these amorphous calcium aluminate cements is closely related to their C/A molar ratio.

Indeed, it could be observed that the reaction was more exothermic for amorphous calcium aluminate cements with a molar ratio higher than 1.6 (Examples 5, 8 and ACA2) than for the others (Examples 1, 2 and 3, and ACA1).

Moreover, the higher the final molar ratio Rf, the faster the exothermic reaction occurs after the mixing with water. Thus, for the amorphous calcium aluminates which molar ratio is higher than 1.6, the increase in temperature occurred within around ten seconds (ACA2) after the test start and around ten minutes (Example 5) after the test start.

In addition, the slope at the origin of these amorphous calcium aluminates is very steep.

On the contrary, for the amorphous calcium aluminates with a molar ratio lower than 1.6, the exothermic reaction seems to be slower and milder.

Finally, it should be noted that the reactivity of the amorphous calcium aluminate cements according to the invention (Examples 1 to 3, 5, 6 and 8) may be directly compared to the reactivity of the amorphous calcium aluminate cements obtained chemically (ACA1 and ACA2).

Especially, the reaction times of the amorphous calcium aluminate cements according to the invention are intermediate between the reaction times of the amorphous calcium aluminate cements chemically obtained (ACA1 and ACA2).

Figure 3:
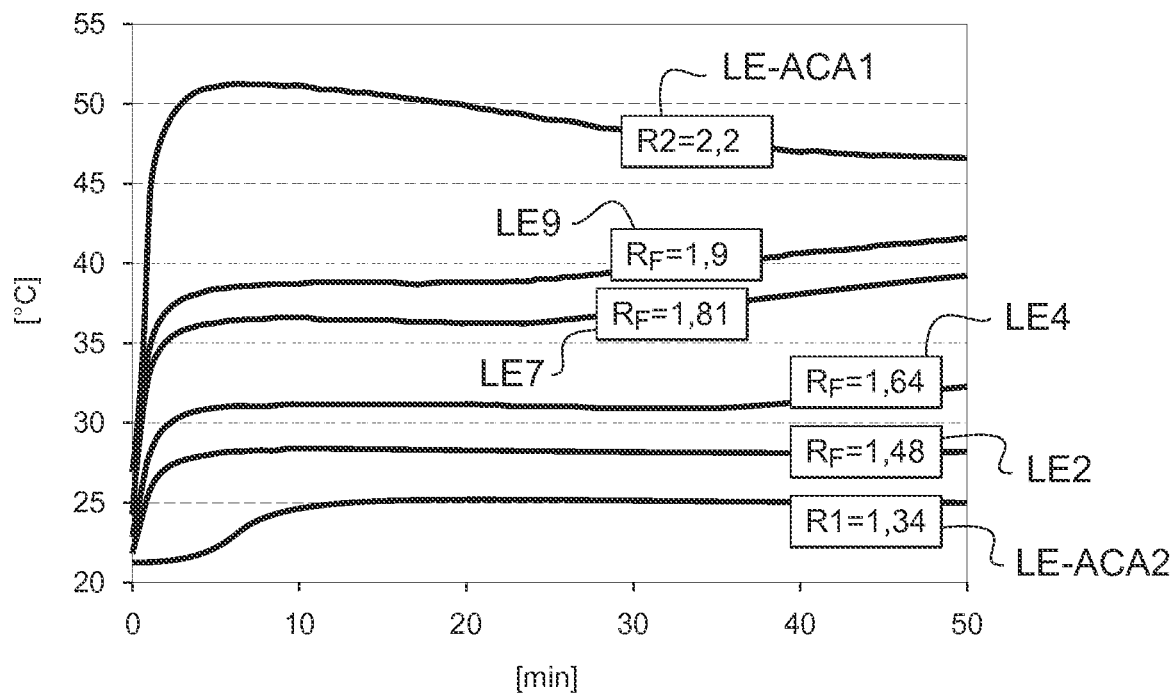
FIG. 3 is a diagram showing the exothermic profile of four compositions according to the invention forming ettringite binders (LE2, LE4, LE7 and LE9), and of ettringite binders comprising respectively the first or the second chemically obtained amorphous calcium aluminate (LE-ACA1 and LE-ACA2)

On FIG. 3, exothermic profiles with short times, that is to say ranging from 0 minute to 50 minutes, ettringite binders, according to the invention (Examples LE2, LE4, LE7 and LE9) or comparative examples (LE-ACA1 and LE-ACA2), confirmed the reactivity observed on amorphous calcium aluminate cements.

Thus, the higher the C/A molar ratio of the amorphous calcium aluminate cements, the more reactive the ettringite binders they form, that is to say the more exothermic (exothermicity) the reaction of these ettringite binders after their mixing with water.

In particular, the reactivity (here exothermicity) of the ettringite binders of the invention is intermediate between those of the two comparative ettringite binders (LE-ACA1 and LE-ACA2).

Thus, the area under the curve, which attests to the heat generally generated by the hydration reaction, is at its maximum for the comparative ettringite binder LE-ACA1, at its minimum for the ettringite binder LE-ACA2, and intermediate for the ettringite binders according to the invention (LE2, LE4, LE7 and LE9).

Especially, it can be noted that the higher the proportion of amorphous calcium aluminate cement chemically obtained ACA2 increases in the composition of ettringite binders according to the invention, the higher the reaction of said ettringite binders according to the invention is exothermic (the exothermicity increases, and the area under the curve increases).

It may thus be concluded from FIGS. 2 and 3 that the C/A molar ratio of the amorphous calcium aluminate cements is a key parameter to be controlled in order to control the reactivity of hydraulic binders, and in particular of ettringite binders.

The present invention offers such a control, insofar as it enables to precisely control the C/A molar ratio of the amorphous calcium aluminate cements.

C2—Mechanical Strength

Figure 4:
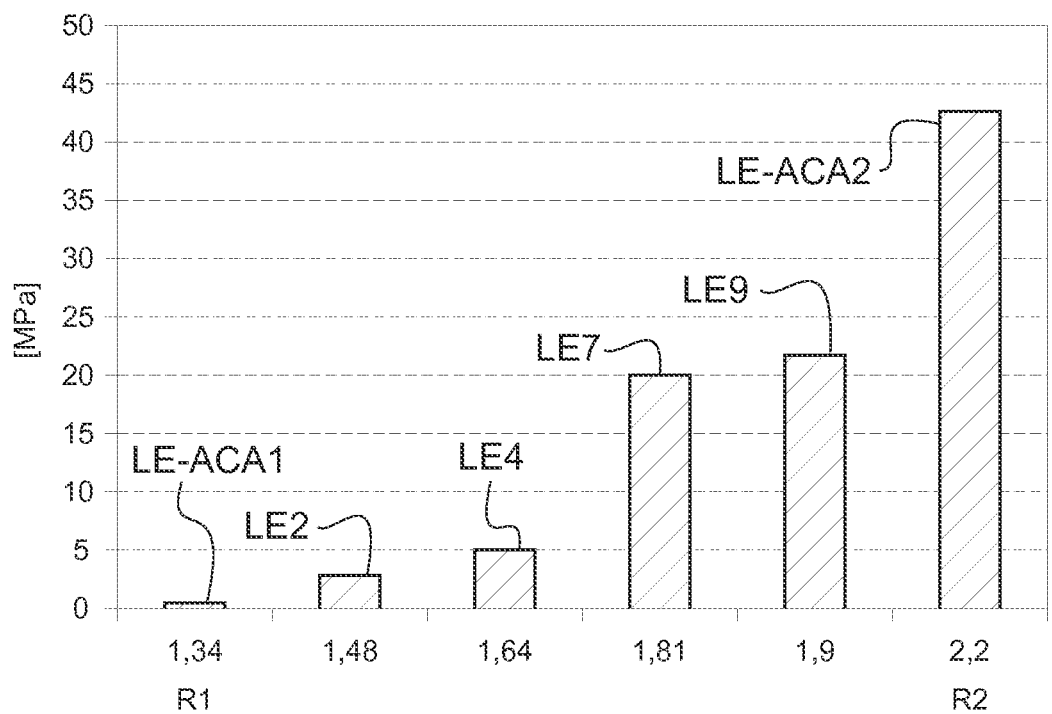
FIG. 4 is a diagram showing the mechanical compressive strength in MegaPascal (MPa) of the six ettringite binders studied on FIG. 3 (LE2, LE4, LE7, LE9, LE-ACA1 and LE-ACA2)

It can be observed on FIG. 4 that the mechanical compressive strength of ettringite binders depends on the C/A molar ratio of the amorphous calcium aluminate cements used.

Thus, the higher the C/A molar ratio, the higher the mechanical strength of the ettringite binder formed.

The mechanical strengths of the ettringite binders of the invention are herein intermediate between the mechanical strengths of the comparative ettringite binders (LE-ACA1 and LE-ACA2).

Especially, it can be noted that the higher the proportion of amorphous calcium aluminate cement chemically obtained ACA2 increases in the composition of the ettringite binders of the invention, the higher the strength of the ettringite binders of the invention.

Figure 5:
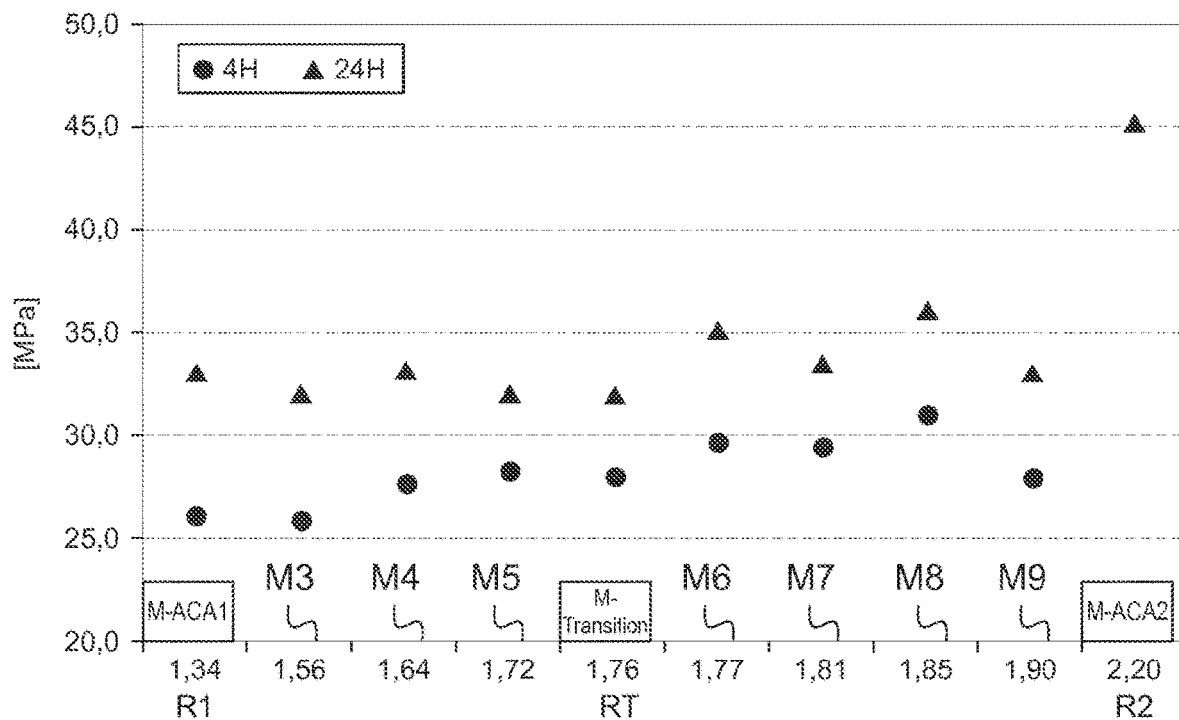
FIG. 5 is a diagram showing the mechanical compressive strength in MegaPascal (MPa) of seven compositions according to the invention forming mortars (M3, M4, M5, M6, M7, M8 and M9), of the comparative mortar (M-Transition), and of mortars comprising respectively the first or the second amorphous calcium aluminate obtained chemically (M-ACA1 and M-ACA2)

It can be noted on FIG. 5 that mortars may be classified in various categories, depending on their mechanical compressive strength, which itself depends on the lime to alumina molar ratio C/A of the amorphous calcium aluminate cements used.

In particular, the C/A molar ratio of the amorphous calcium aluminate cements used in the mortar compositions has an influence onto the mechanical compressive strength of mortars at an early age, that is to say 4 h after the end of the mixing with water.

FIG. 5 shows that the behavior of the mortars based on amorphous calcium aluminates according to the invention is predictable as a function of the C/A molar ratio.

Thus, thanks to the present invention, it is possible to easily adjust the C/A molar ratio of the amorphous calcium aluminate in order to obtain the desired mechanical compressive strengths 4 hours or 24 hours after the mixing with water.

This is not possible with crystalline calcium aluminates.

Here again, these results demonstrate that it is important to be able to precisely control the molar ratio of the amorphous calcium aluminate cements. The present invention is particularly useful for such a control.

C3—Comparison Between Two Amorphous Calcium Aluminates

Finally, various results emphasize the fact that the amorphous calcium aluminate cements of the invention have properties that are at least similar to those of the amorphous calcium aluminate cements obtained chemically.

For example, as regards their reactivity, the amorphous calcium aluminate cements of the invention have the same behavior as the comparative amorphous calcium aluminate cements, obtained chemically.

Figure 6:
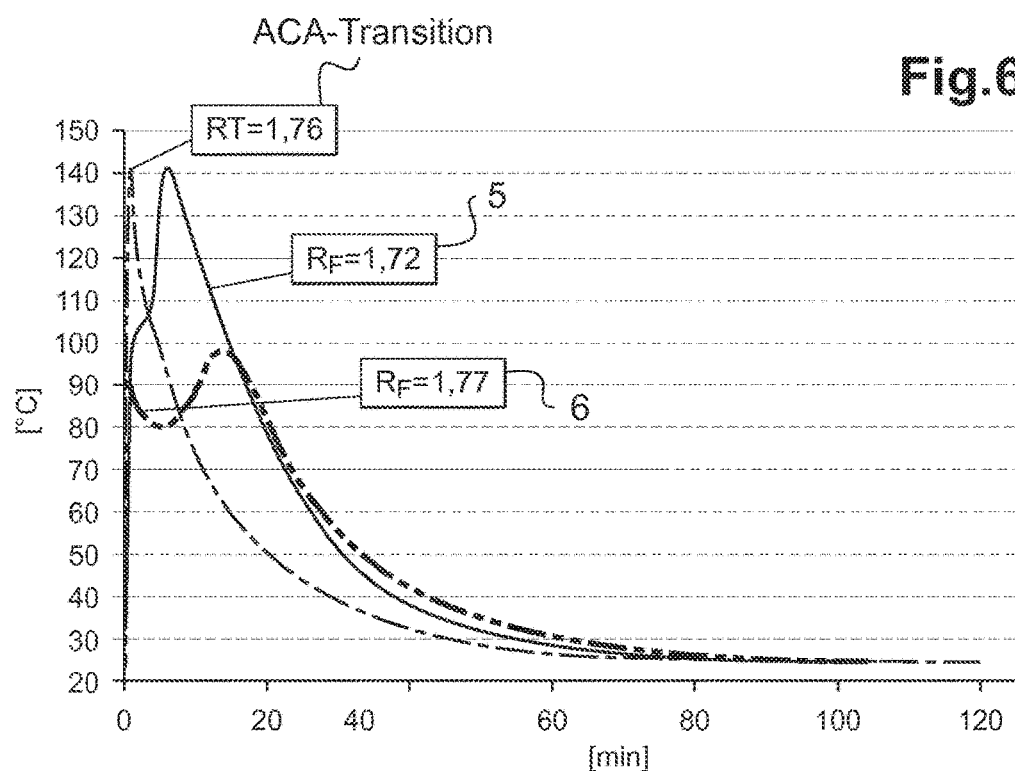
FIG. 6 is a diagram showing the exothermic profile of the comparative amorphous calcium aluminate (ACA-Transition) and of two compositions according to the invention comprising amorphous calcium aluminates of Examples 5 and 6; and, FIG. 7 is a diagram showing the exothermic profile of comparative mortar (M-Transition), and of the composition of the invention forming mortar M6.

Indeed, FIG. 6 shows that the amorphous calcium aluminate cements of Examples 5 and 6 ($R_F$=1.72 and $R_F$=1.77) have an absolutely similar reactivity as compared to that of the comparative amorphous calcium aluminate cement ACA-Transition (RT=1.76).

The reaction times range between a few minutes and maximum 20 minutes and the temperature rises to almost 100° C. for the cement of Example 6, or even to 140° C. for the cement of Example 5 and the comparative cement ACA-Transition.

Moreover, the slopes at the origin of the three curves of FIG. 6 are similar (all the three curves are very steep), and it is possible to approach the peak temperature reached by the ACA-Transition.

Figure 7:
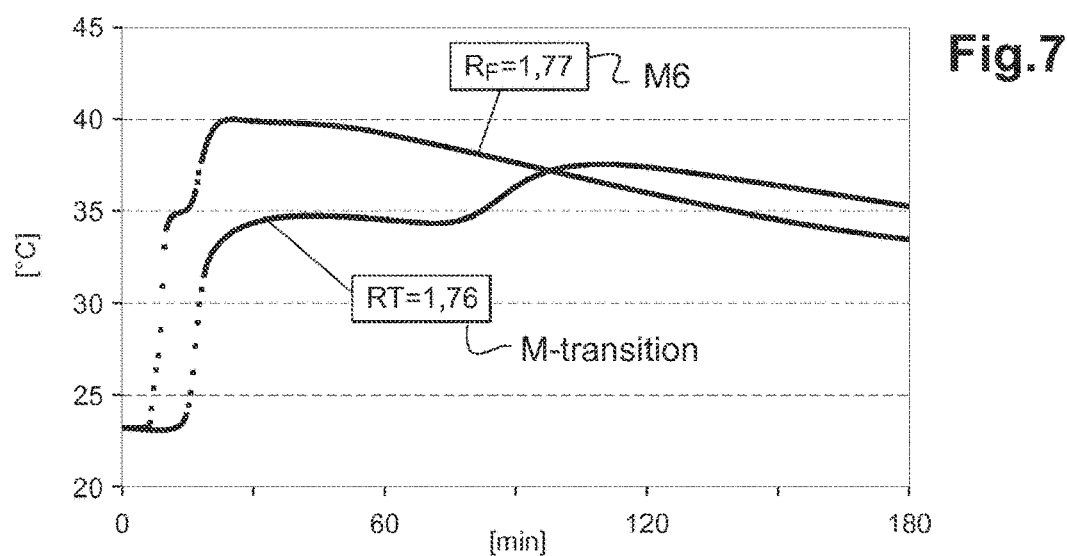

In addition, FIG. 7 proves that the mortar obtained from the cement of the invention (from Example 6) has a very similar reactivity to that of the mortar using the comparative cement obtained chemically ACA-Transition. Indeed, their exothermic profiles are very close, and about 30 minutes after having been mixed with water, their temperature only differs by 5° C.

In other respects, FIG. 5 shows that the mechanical compressive strengths of mortars comprising respectively one of the two cements according to the invention of Examples 5 and 6 or the comparative cement ACA-Transition are also similar. Indeed, they all have a comparable mechanical strength, even though the other experimental parameters, such as any set retarders or accelerators, have not been optimized.

Thus, the results set out above show that the properties of the amorphous calcium aluminates according to the invention, obtained according to the method of the invention, are predictable on the basis of the properties of the combined amorphous calcium aluminates.

Moreover, the properties of the amorphous calcium aluminates according to the invention, obtained according to the method of the invention, are similar, at an equivalent C/A molar ratio, to those of the amorphous calcium aluminates obtained by a chemical process.

The invention claimed is:

1. A composition comprising an amorphous calcium aluminate with a final lime to alumina molar ratio ($R_F$) comprised within a range that extends between a lower limit (Ri) having a value greater than 0.01 and an upper limit (Rs) having a value less than 15, said lower limit (Ri) being different from the upper limit (Rs), wherein said amorphous calcium aluminate is a combination composed of at least:
a first amorphous calcium aluminate with a first lime to alumina molar ratio (R1) that is lower than the lower limit (Ri) of said range, and
a second amorphous calcium aluminate with a second lime to alumina molar ratio (R2) that is higher than the upper limit (Rs) of said range and wherein said combination comprises a first amount of the first amorphous calcium aluminate and a second amount of the second amorphous calcium aluminate, said first and second amounts being determined in such a way that the final lime to alumina molar ratio ($R_F$) of the amorphous calcium aluminate, corresponding to the average of the first and second lime to alumina molar ratios (R1, R2) weighted by said first and second amounts, is within said range.

2. The composition according to claim 1, wherein the difference between said first and second lime to alumina molar ratios (R1, R2) is higher than or equal to 0.1.

3. The composition according to claim 1, wherein said first lime to alumina molar ratio (R1) of said first amorphous calcium aluminate is ranging from 0.01 to 3.

4. The composition according to claim 1, wherein said second lime to alumina molar ratio (R2) of said second amorphous calcium aluminate is ranging from 1.5 to 2.

5. The composition according to claim 1, further comprising at least one compound chosen from calcium sulfate, Portland cement, or a combination thereof.

6. The composition according to claim 5, comprising by weight as compared to a dry total weight thereof:
from 35% to 75% of said amorphous calcium aluminate;
from 25% to 65% of calcium sulfate, and
from 0% to 5% of an additive.

7. The composition according to claim 5, comprising by weight as compared to a dry total weight thereof:
from 2% to 30% of said amorphous calcium aluminate,
from 4% to 40% of calcium sulfate,
from 30% to 94% of Portland cement, and
from 0% to 5% of an additive.

8. The composition according to claim 5, comprising by weight as compared to a dry total weight thereof:
from 10% to 35% of said amorphous calcium aluminate,
from 15% to 56% of calcium sulfate,
from 2% to 30% of Portland cement, and
from 0% to 5% of an additive.

9. The composition according to claim 1, further comprising, by weight as compared to a composition total weight from 50% to 95% of aggregates.

10. The composition of claim 5, further comprising one or more additives.

11. The composition of claim 6, wherein the amorphous calcium aluminate is present in a range of 35% to 50% by weight as compared to a total dry weight of the composition.

12. The composition of claim 10, wherein the amorphous calcium aluminate is present in a range of 35% to 50% by weight as compared to a total dry weight of the composition.

13. The composition of claim 1, wherein said lower limit (Ri) has a value of 1.34 and said upper limit (Rs) has a value of 2.2.

14. A method for making a composition comprising an amorphous calcium aluminate with a final lime to alumina molar ratio ($R_F$) selected within a range that extends between a lower limit (Ri) having a value greater than 0.01 and an upper limit (Rs) having a value less than 15, said lower limit (Ri) being different from the upper limit (Rs), wherein,
a) a first amorphous calcium aluminate is chosen, with a first lime to alumina molar ratio (R1) that is lower than the lower limit (Ri) of said range, and a second amorphous calcium aluminate is chosen, with a second lime to alumina molar ratio (R2) that is higher than the upper limit (Rs) of said range,
b) the respective amounts of said first and second amorphous calcium aluminates to be combined are determined so that the final lime to alumina molar ratio ($R_F$) of amorphous calcium aluminate corresponding to the average of said first and second lime to alumina molar ratios (R1, R2), weighted by said respective amounts, is within said range;
c) said first and second amorphous calcium aluminates are combined according to the amounts determined in step b).

15. The method according to claim 14, wherein, in step a), said first and second amorphous calcium aluminates are chosen in the form of powders, and, in step c), these powders are combined so as to obtain said amorphous calcium aluminate-containing composition.

16. The method according to claim 14, wherein, in step a), the first and second amorphous calcium aluminates are chosen in the form of clinkers, and, in step c), these clinkers are combined through co-grinding so as to obtain said amorphous calcium aluminate-containing composition.

17. The method of claim 14, wherein said lower limit (Ri) has a value of 1.34 and said upper limit (Rs) has a value of 2.2.

\* \* \* \* \*